April 12, 1932.   J. F. OHMER ET AL   1,853,741
FARE REGISTERING, RECORDING, AND TICKET ISSUING MACHINE
Filed Aug. 28, 1925   12 Sheets-Sheet 1

Inventors
John F. Ohmer
Albert S. Wheelbarger
By Hastings W. Baker
Attorney

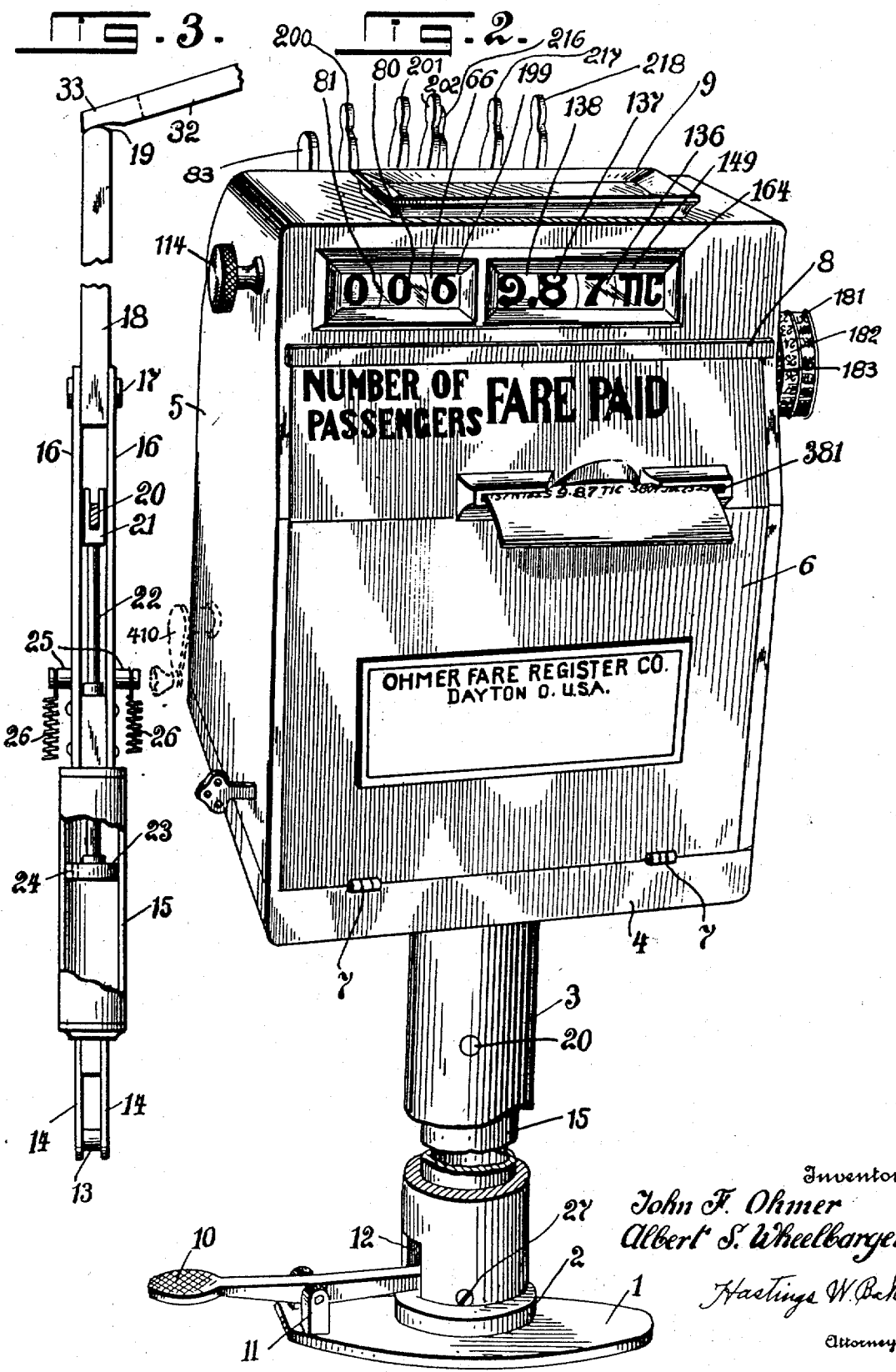

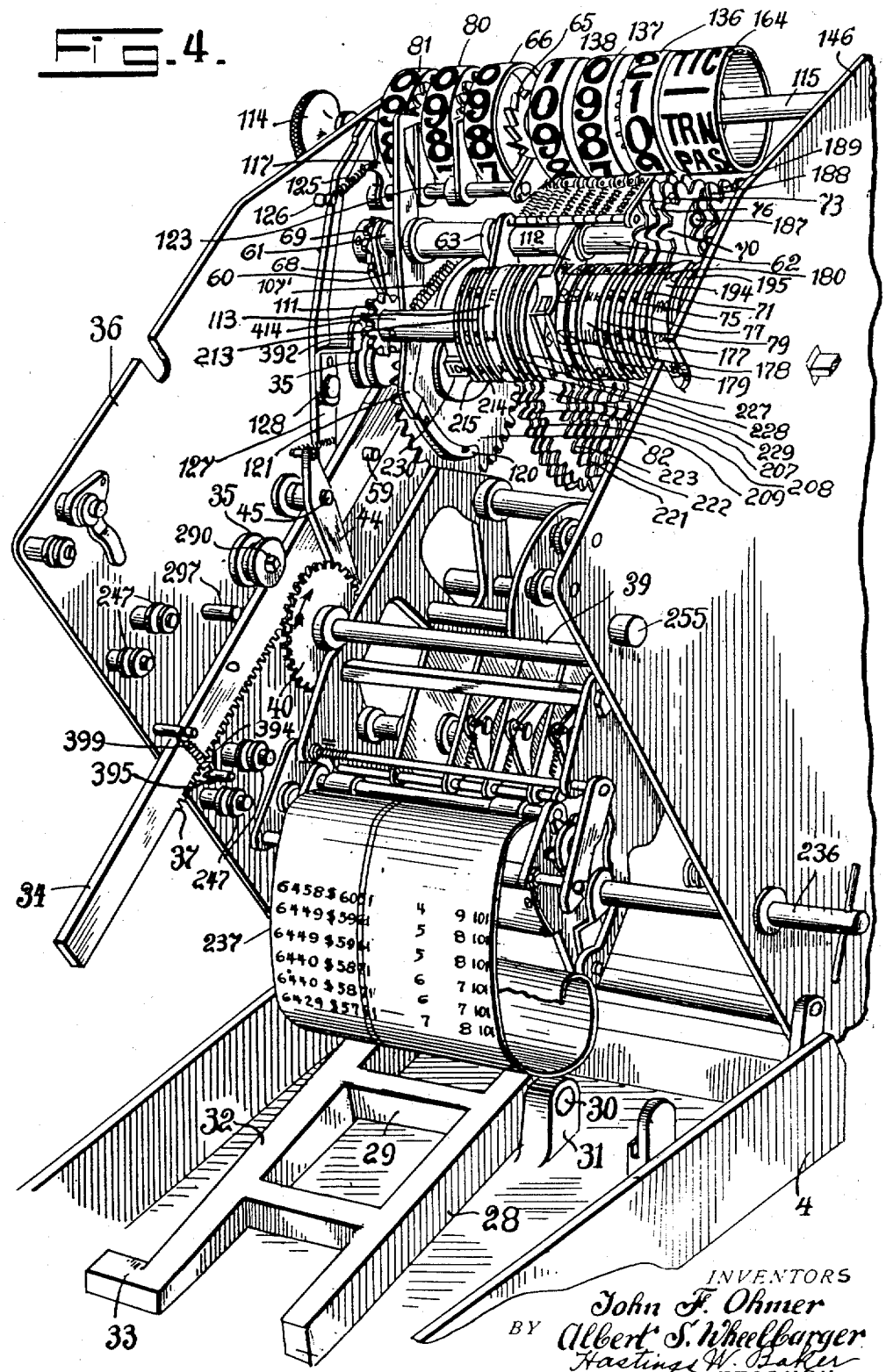

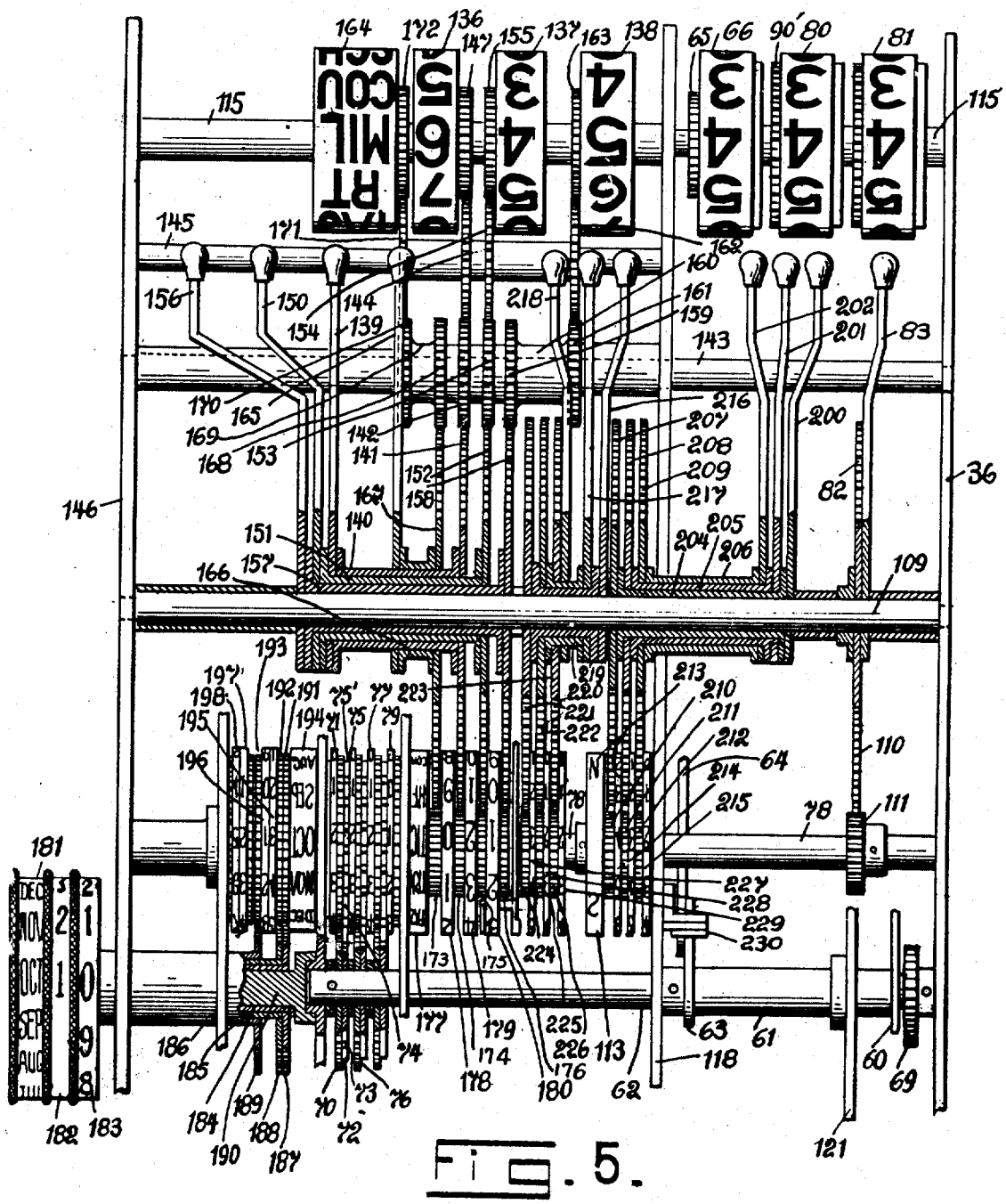

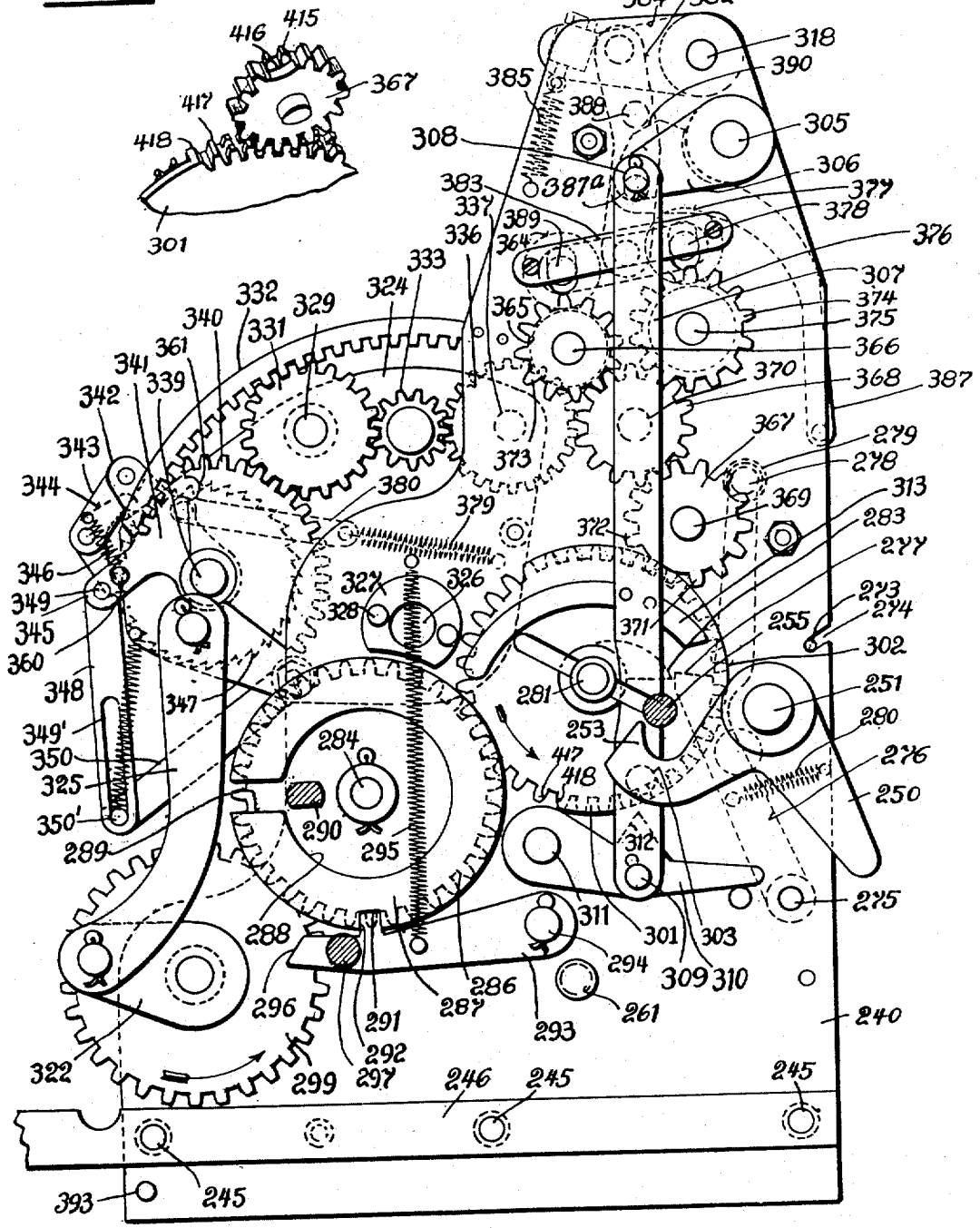

April 12, 1932. J. F. OHMER ET AL 1,853,741
FARE REGISTERING, RECORDING, AND TICKET ISSUING MACHINE
Filed Aug. 28, 1925  12 Sheets-Sheet 6

INVENTORS
John F. Ohmer.
BY Albert S. Wheelbarger
Hastings W. Baker
ATTORNEY

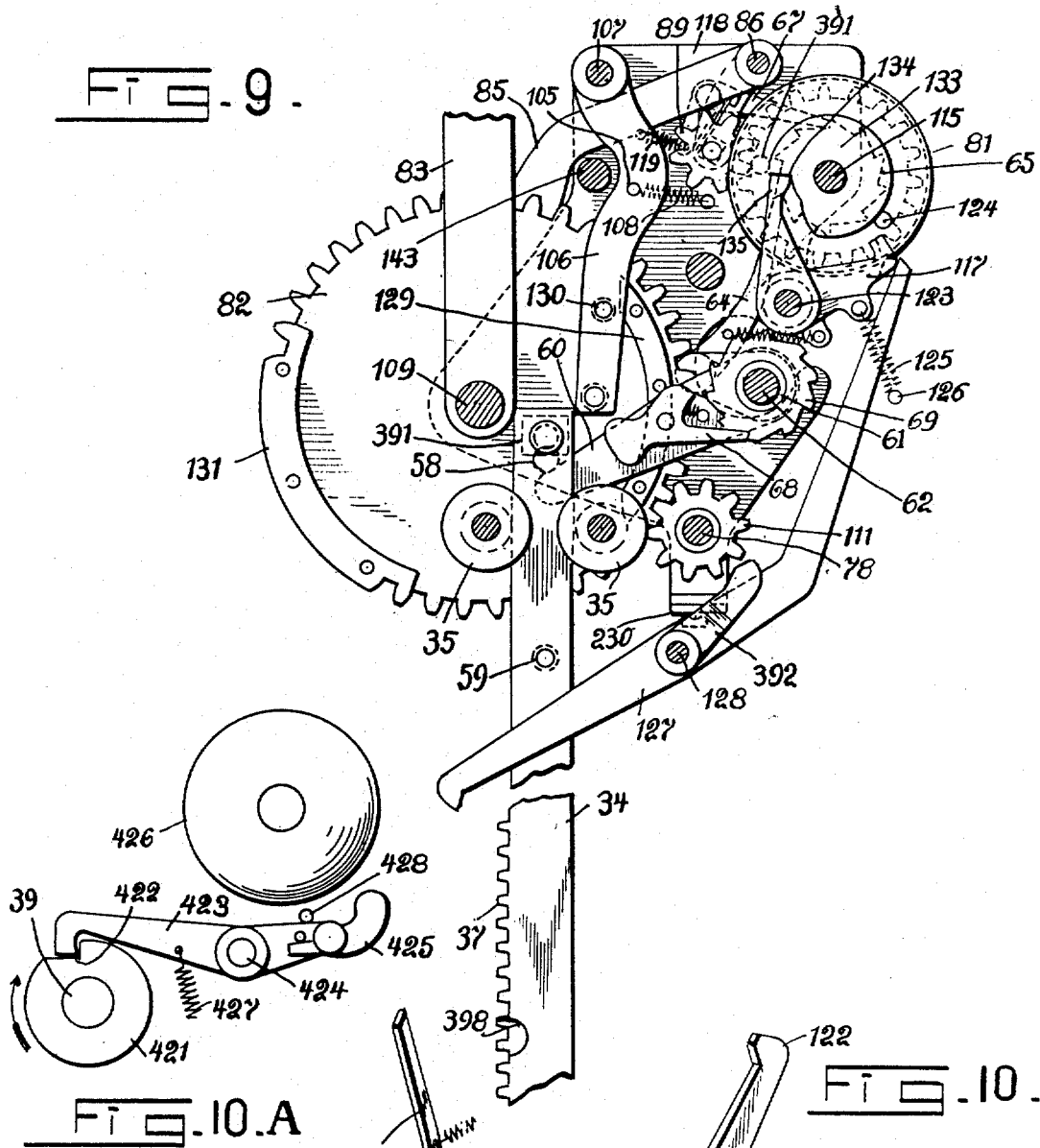

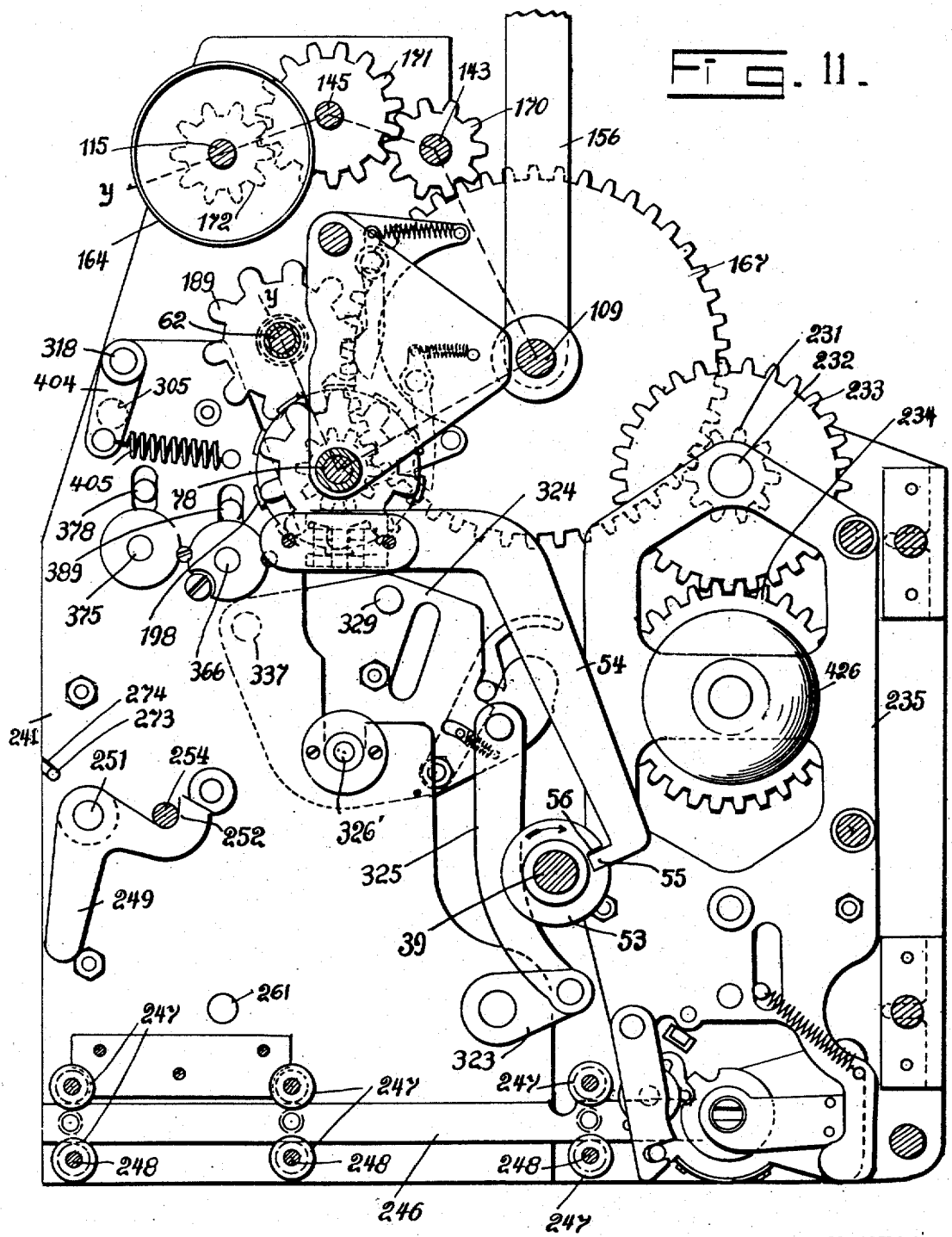

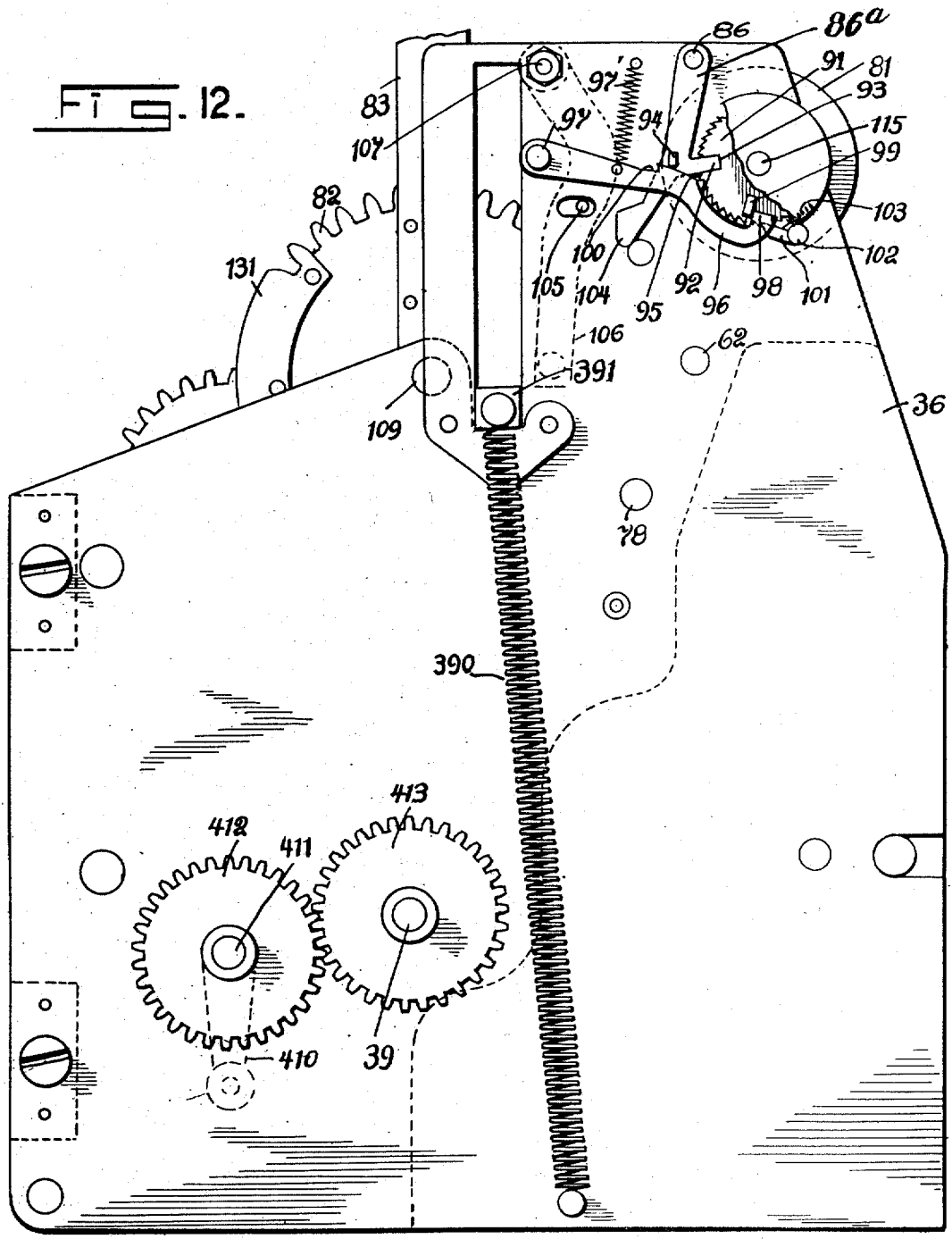

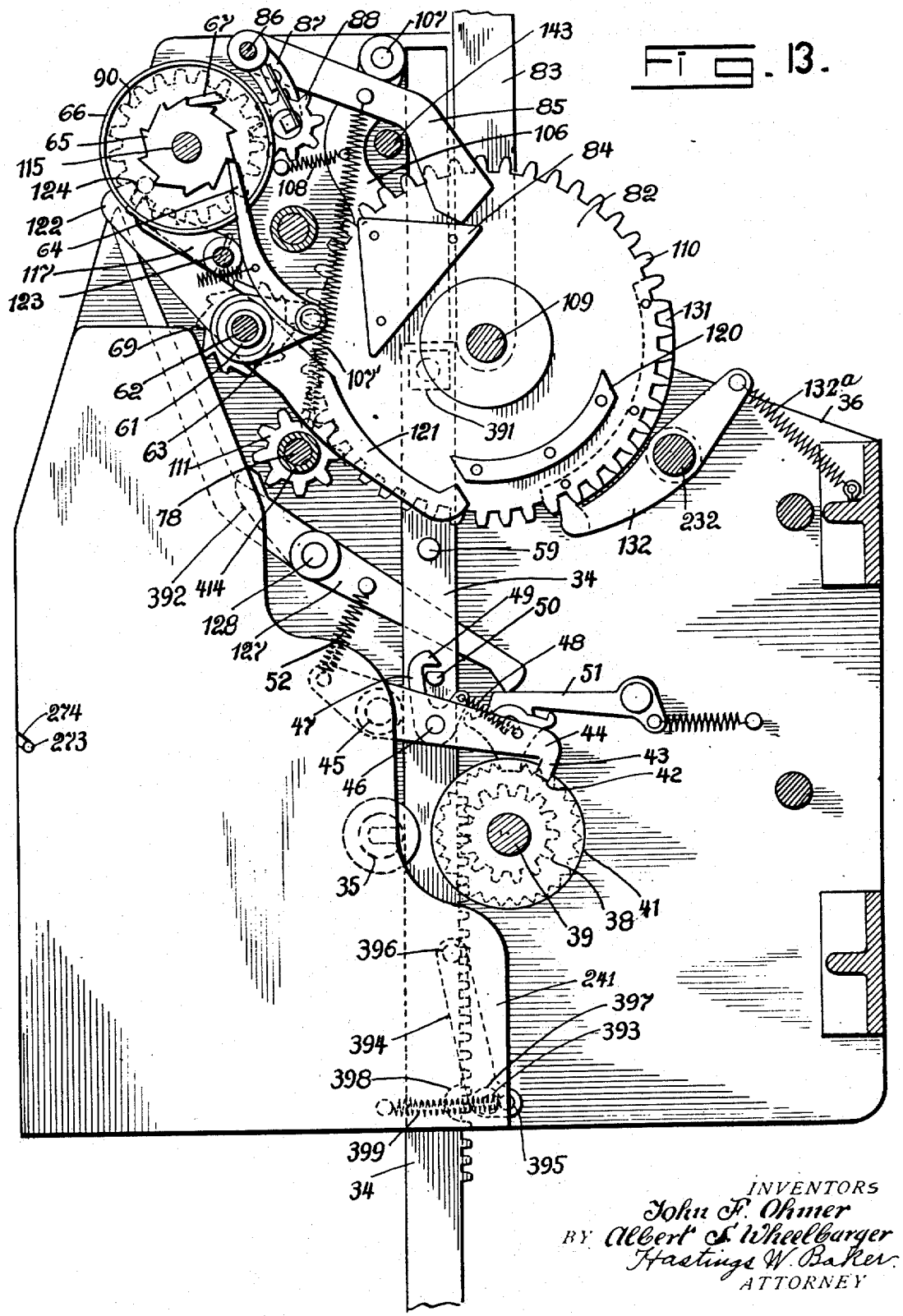

April 12, 1932.  J. F. OHMER ET AL  1,853,741

FARE REGISTERING, RECORDING, AND TICKET ISSUING MACHINE

Filed Aug. 28, 1925   12 Sheets-Sheet 12

Fig. 15.

| 101 | 0 0 0 N. | 0 0 0 $ | .0 0 |     | 7 0 4 4 | AUG | 5 25 | 10 |
|-----|----------|---------|------|-----|---------|-----|------|-----|
| 101 | 1 2 2 N. | 1 0 9 $ | .0 0 | H.F | 7 0 4 5 | AUG | 5 25 | 10 |
| 101 | 1 2 2 N. | 0 9 7 $ | .0 0 | COM | 7 0 4 6 | AUG | 5 25 | 10 |
| 101 | 1 2 2 N. | 1 1 1 $ | .0 0 | SCH | 7 0 4 7 | AUG | 5 25 | 10 |
| 101 | 1 2 2 N. | 1 2 1 $ | .0 0 | COU | 7 0 4 8 | AUG | 5 25 | 10 |
| 101 | 1 2 2 N. | 1 1 9 $ | .0 0 | MIL | 7 0 4 9 | AUG | 5 25 | 10 |
| 101 | 1 2 2 N. | 1 2 0 $ | .0 0 | R.T | 7 0 5 0 | AUG | 5 25 | 10 |
| 101 | 1 2 2 N. | 1 1 7 $ | .0 0 | PAS | 7 0 5 1 | AUG | 5 25 | 10 |
| 101 | 1 2 2 N. | 1 1 6 $ | .0 0 | TRN | 7 0 5 2 | AUG | 5 25 | 10 |
| 101 | 1 2 2 N. | 1 2 0 $ | .2 0 |     | 7 0 5 3 | AUG | 5 25 | 10 |
| 101 | 1 2 2 N. | 1 1 0 $ | 3.2 0|     | 7 0 5 4 | AUG | 5 25 | 10 |
| 101 | 1 2 2 N. | 1 0 9 $ | 3.2 2|     | 7 0 5 5 | AUG | 5 25 | 10 |
| 101 | 1 2 2 N. | 1 0 5 $ | 3.4 2|     | 7 0 5 6 | AUG | 5 25 | 10 |
| 101 | 1 2 2 N. | 0 9 0 $ | 7.4 2|     | 7 0 5 7 | AUG | 5 25 | 10 |
| 101 | 1 2 2 N. | 0 8 8 $ | 7.5 9|     | 7 0 5 8 | AUG | 5 25 | 10 |
| 101 | 1 2 2 N. | 0 8 8 $ | 9.5 9|     | 7 0 5 9 | AUG | 5 25 | 10 |
| 101 | 1 2 2 N. | 0 8 6 $ | 9.7 9|     | 7 0 6 0 | AUG | 5 25 | 10 |

Fig. 16.

1 2 2 N. 0 8 6 $ 9.7 9   7 0 6 0 AUG 5 25

FROM – TO
THIS IS A RECEIPT FOR THE FARE PAID, AND IT SHOWS
THE NUMBERS OF THE STATIONS FROM AND TO WHICH
YOU ARE ENTITLED TO RIDE. NAMES OF STATION WITH
THEIR NUMBERS MAY BE OBSERVED ON DISPLAY CARDS
POSTED IN THE CAR. RETURN THIS RECEIPT TO CON-
DUCTOR UPON ARRIVAL AT DESTINATION.
PUBLIC SERVICE CO.

Ohmer Fare Reg. Co., Dayton, O.   Construction Criticism Welcome.

Fig. 17.

| 7 0 6 0 | $ 4 1 0 4 | 7 | 4 | 101 |
| 7 0 4 4 | $ 4 0 6 0 | 3 | 1 | 101 |

237

Inventors
John F. Ohmer
Albert S. Wheelbarger

By Hastings W. Baker
Attorney

Patented Apr. 12, 1932

1,853,741

UNITED STATES PATENT OFFICE

JOHN F. OHMER AND ALBERT S. WHEELBARGER, OF DAYTON, OHIO, ASSIGNORS TO OHMER FARE REGISTER COMPANY, OF DAYTON, OHIO, A CORPORATION OF OHIO

FARE REGISTERING, RECORDING, AND TICKET ISSUING MACHINE

Application filed August 28, 1925. Serial No. 53,082.

This invention relates to new and useful improvements in the machines shown and described in the patents of John F. Ohmer, 974,511 dated November 1, 1910, 1,056,765 dated March 18, 1913, 1,197,655 dated September 12, 1916, 1,242,967 dated October 16, 1917, 1,274,192 dated July 30, 1918, 1,182,410 dated May 9, 1916, and the patents to John F. Ohmer and Harry J. Sibley, 1,210,971 dated January 2, 1917, and 1,210,973 dated January 2, 1917.

This invention relates to new and useful improvements in machines for registering, recording and issuing tickets on railways, street cars, and busses and is designed to take the place of the usual cumbersome, spacious ticket racks common to ticket offices. The machines may be placed on the cars and tickets printed and issued by the conductor, thereby eliminating the necessity of a ticket agent.

At the present time transportation tickets are printed and forwarded to the ticket offices. These tickets contain the name of the issuing station, the destination and other printed matter. If there were 999 stations, 997,002 different tickets would be required, in order to have one ticket from each station to each of the other stations. Since each station should have a quantity of tickets to each of the other stations, an immense number of tickets would be required. Assuming that each station were provided with only 100 tickets to each of the other stations, the number of tickets required would be 99,700,200. These tickets are costly and require expensive filing equipment. Furthermore, each of these tickets must be dated by the ticket agent. The present arrangement is so cumbersome that it is utterly impracticable either to issue these tickets on the cars, or to dispense with the ticket agent.

The present invention relates to a machine that eliminates the necessity of printing vast quantities of tickets and providing cumbersome filing equipment therefor. The machine issues the ticket showing the station where the passenger boards the car, the destination, the direction of travel, the amount he paid for the transportation, the serial number of the ticket, the date and any other information, such as instructions to the passenger in regard to the ticket. The cost of printing and issuing the ticket, by means of the machine described in this application, is simply the cost of the paper which is an insignificant item when compared with the cost of printing vast numbers of tickets as at present.

In the contruction shown herein, the machine prints the numbers of the stations instead of the names of the stations as is common railway practice. The mechanism to print the numbers of stations from and to which the ticket is issued, the amount paid for the transportation, the classification of the ticket and the direction of travel are controlled by hand levers operated by the conductor. However, at the time when the passengers are getting on the car, only a few of these levers need be touched by the conductor, for the station at which the car is and its direction of travel would be set only once. After the levers are set the conductor steps on a treadle or turns a crank and the ticket is issued in such a position that the passenger takes the ticket directly from the machine and passes into the car. Obviously, the machine may be operated by other means than the treadle or a crank. It may be actuated by an electric motor connected with the lighting circuit of the car, or it may be operated by the air-pressure service usually employed for applying brakes to the car. Any suitable actuating means may be employed without departing from either the spirit of this invention or the scope of the claims. The time consumed in issuing the ticket is very little indeed for the operation of the machine is very rapid, and the conductor can operate the machine as quickly as the passengers can board the car.

Another object of the invention is to provide a detailed record which is printed almost simultaneously with the tickets and which detailed record shows the number of the machine, the stations from and to which the tickets were issued, the direction of travel, the amount paid for each ticket, the class of transportation, the serial number showing the total number of tickets that the machine had issued, the month, day and year, and the conductor's number. Furthermore, both the ticket and detailed record are printed from one bank of printing wheels.

Another object of the invention is to provide means whereby the transaction of the conductor may be readily audited and means are provided whereby when the conductor turns a key on starting his run, a record is printed showing the number of tickets issued up to that time, the amount of fares heretofore paid for the tickets and the number of the machine. When his run has been completed he again turns the same key and a second record showing the same items is printed below the first record. The difference between the figures on these two impressions indicates the total number of passengers carried between the time the two impressions were made and the total amount received from these passengers. The only auditing therefore, that is required consists of two simple substractions and nothing else. This is rendered possible by the use of the total auditing mechanism shown in the applications of Albert S. Wheelbarger, Serial Number 759,170, filed December 31, 1924, and 28,552 filed May 7, 1925.

This invention is particularly applicable to interurban railways and busses, where frequent stops are required. It is impracticable to provide a ticket office at each of these stops and the fares are usually collected in cash. The ticket issued by the machine described in this application serves every purpose that the present form of tickets accomplish, while saving the expense of printing the tickets, eliminating the need of a ticket office and providing a complete auditing system.

In practice it is intended that the tickets should be taken by the passenger as soon as he pays his fare and retained by him until he leaves the car, when he surrenders the ticket to the conductor. Inasmuch as the passenger's destination is printed on the ticket it is impossible for the passenger to ride further than his destination without paying for the additional ride. If the superintendent of the transportation company suspects that one of the conductors is dishonest and is reselling the tickets to passengers on runs subsequent to the one on which the ticket was issued, an inspector could board a car at any place and look over or inspect the tickets held by the passengers. In case any passenger held a ticket not issued on that run, it would be proof conclusive that the conductor was dishonest. A ready means is, therefore, afforded for eliminating any dishonest practice by the conductor.

This invention provides many other improvements, such as printing the ticket by two operations so that the ink used in printing the body of the ticket would have time to dry before the ticket is issued. The machine is locked against operation unless the conductor's key is inserted in the machine. Means are provided whereby a ticket must be completely issued before a subsequent ticket can be issued. Furthermore, means are provided to drive the ticket paper feed mechanism at a higher rate of speed than the mechanism driving the detailed record paper feed, thereby economizing in the use of paper.

The machine is so constructed that one or more units thereof may be omitted to suit the varying needs of the transportation company. As a matter of fact, a portable machine has been constructed which will perform the function of issuing a ticket and making a record thereof which ticket and record would be in the form shown in this application and would comprise the printer, the feeding and setting mechanism, printing wheels and actuators therefor, in combination with the date wheels and the parts would function in the precise manner indicated in this application. The portable machine would eliminate the passenger and fare indicators and all other actuated indicators, as well as the totalizer, the totalizing printing mechanism and the pedestal foot operating mechanism. In other words a portable machine has been constructed by simply eliminating all of the units and features shown in this application except those which are necessary to perform the function of printing and issuing the tickets and making a record thereof. By constructing such a machine of light metals, the machine would not be too heavy to be carried by the conductor, as by strapping it over his shoulder, while at the same time it could, of course, be mounted on a small pedestal in the car.

In the accompanying drawings Figure 1 is a rear view of the machine or the side facing the conductor.

Figure 2 is a front view or the side facing the passenger showing a ticket in position to be grasped by the passenger.

Figure 3 is a detailed view partly in cross section showing the dash pot in the supporting pedestal of the machine.

Figure 4 is a perspective view of the machine in an elevated position with the printing mechanism or unit omitted and the casing removed.

Figure 5 is a view, partly in cross section, of the shafts connected by the line y—y of Figure 11 and showing the parts mounted thereon.

Figure 6 is a side elevational view of the left-hand side of the printer. Figure 6A is a detailed perspective view of the gearing to actuate the ticket paper feeding means.

Figure 9 is a sectional view taken immediately to the right of the left-hand side of the frame shown in Figure 4 and looking to the right.

Figure 10 is a perspective view of the actuating means for visible disks to indicate the number of passengers carried on the trip.

Figure 10A is a side elevational view of the audible signal.

Figure 11 is a cross sectional view taken on the inside of the right-hand side plate shown in Figure 4, looking to the left and including the side view of the printing mechanism or unit in position.

Figure 12 is an elevational view of the left-hand side of the machine, showing the printing unit in outline.

Figure 13 is a cross sectional elevation of the reverse side of the structure shown in Figure 9.

Figure 15 is a view of the printed detailed record.

Figure 16 is a view of one of the tickets issued by the machine, and

Figure 17 is a view of the record made by the total adder printing means and used in auditing the accounts.

Throughout the specification and drawings, similar reference characters indicate corresponding parts.

Figure 1:
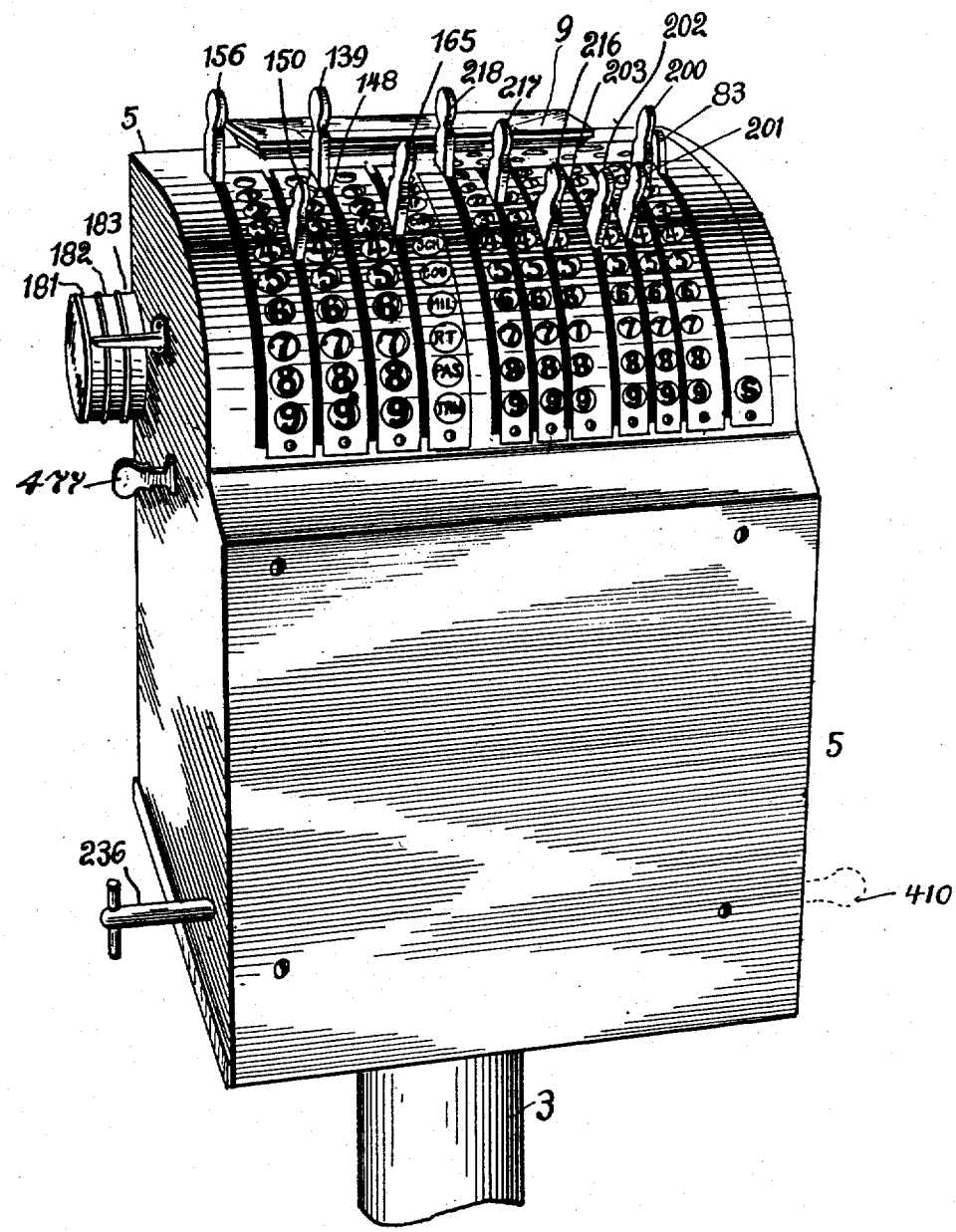

Referring more particularly to the drawings the machine is mounted on a floor plate 1 provided with a suitable boss 2, which receives the lower end of a supporting column 3, on which rests the bottom plate 4 of the machine.

A suitable cover 5 is provided, inclosing the top, back and the two sides of the machine and extending over a portion of the back of the machine as shown in Figure 2. A front cover 6 is hinged to the bottom plate 4 by means of hinges 7. The cover 5 is provided with a flange 8 which extends over the upper edge of the front cover 6 so that the front cover is held in place when the cover is in position on the machine. The covers are provided with various apertures and slots which will be described with the related structure of the machine. The covers are, of course, made of a suitable material and so finished as to present a neat and attractive appearance. On top of the cover is provided a coin tray 9 so as to facilitate the collections of the fares.

The machine is actuated from a treadle 10 mounted in lugs 11 which treadle extends through a slot 12 in the supporting column 3. The inner end of the treadle 10 is mounted on a pin 13 carried by the lower ends of two bars 14 which are attached to the lower end of a dash pot 15, which dash pot is closed at both ends as shown in Figure 3. Bars 16 extend from the upper end of the dash pot 15, which bars are secured together at the upper end by means of a pin 17 on which pin is secured a bar 18 provided at its upper end with a beveled surface 19. A pin 20 extends through the supporting column 3 and receives a yoke 21 carried by the upper end of a rod 22, which rod carries on its lower end a piston 23 provided with a hole 24, which piston is slidable within the dash pot 15. The bars 16 are provided with pins 25, to which are attached springs 26, which are secured at their other ends in the lower part of the supporting column 3 by means of pins 27.

Each time the treadle is depressed by the operator stepping on the same, the bars 14 are raised, carrying with it the dash pot 15, the bars 16 and the bar 18. The dash pot is filled with air, water, oil or other fluid and as the dash pot is raised relatively to the piston 24, the fluid below the piston 23 passes through the hole 24 to the upper side of the piston, the fluid serving as a steadying means to the actuating mechanism so as to relieve it from all shocks and jars incident to the operation. When the operator's foot is removed from the treadle 10 the springs 26 pull the dash pot downwardly relative to the piston 23 and the fluid moves in the reverse direction from that heretofore described.

The beveled surface 19 of the bar 18 engages an arm 28 of a plate 29. The plate 29 is pivoted as at 30 to lugs 31 carried by the bottom plate 4. A second arm 32 of the plate 29 is provided with a laterally extending lug 33, which lug is provided with an upper beveled surface. Each time the treadle, therefore, is depressed the plate 29 is raised on its pivot 30.

The lug 33 engages a rack bar 34 slidable between rollers 35 mounted on pins carried by the left-hand frame wall 36 of the casing of the machine. The rack bar 34 is provided with teeth 37 which engage the teeth of a pinion 38 loosely mounted on the main drive shaft 39. The main drive shaft is provided with a gear 40 (Figures 7 and 13) carrying a circular hub 41 which hub is provided with a notch 42 adapted to receive a finger 43 depending from a lever 44, fulcrumed at 45 to the side frame 36. The lever 44 is provided with a pin 46 serving as a fulcrum for a bell crank lever 47, which bell crank lever is normally pulled in a clockwise direction by means of a spring 48. The lever 47 carries a finger 49 which finger normally lies in the path of movement of a pin 50 carried by the rack rod 34. The pinion 38 is not directly connected with the gear 40 nor with the main drive shaft 39. This connection is clearly shown in Figures 21 and 22 of application of Albert S. Wheelbarger, Serial Number 759,170 as is the full stroke mechanism 51 and the description of these parts need not be repeated in this application. It is therefore apparent that each time the treadle is depressed the rack rod 34 is raised so that the pin 50 engages the finger 49 and raises the lever 44 against the tension of the spring 52, removing the finger 43 from the notch 42, so that the main drive shaft 39 can be rotated. The finger 49 after raising the lever 44 slides off the pin 50, and the finger 43 therafter rides on the periphery of the hub 41. A sufficient number of teeth are provided on the pinion 38 so that one complete rotation will be imparted to the shaft 39 each time the treadle is depressed, while on the return movement of the rack rod 34 the shaft 39 is held against rotation by means of the lever 44 engaging the notch 42 in the hub 41 secured to the gear 40, which gear is rigidly mounted on the shaft 39. On this reverse movement the pinion 38 is permitted to rotate by means of the overrunning pawl as shown in the above mentioned copending application. As soon as the treadle is released the spring 390 secured to the side wall 36 and to a lug 391 of the rack rod 34, pulls the rack rod down into its initial position.

At the other end of the shaft 39 is a flanged disk 53 (Figure 11) which cooperates with a lever 54. Each conductor is provided with an identifying key 477 (Figure 1) which raises the finger 55 of the lever 54 from a single notch 56 in the disk 53 as is clearly shown and described in the said copending application of Wheelbarger 759,170. The machine is therefore locked against operation until the conductor's key is inserted and the key must be fully inserted so that the printed number, which is the conductor's number, carried on the end of the key must be in printing position.

The upper end of the rack rod 34 is provided with two spaced pins 58 and 59, (Figures 4, 9 and 13). As the pin 59 is raised with the rack rod 34 it engages an arm 60 mounted on a sleeve 61, which sleeve is rotatably mounted on the shaft 62. The sleeve 61 also carries a crank arm 63 which actuates a finger 64, which finger actuates a ratchet 65 secured to the units counter 66 of the counting mechanism showing the number of passengers carried on that trip. A pin 391' (Fig. 9) is carried by the partition wall 118 to prevent overthrow of the finger 64. A suitable pivoted pawl 67 is provided to prevent retrograde movement as the finger 64 moves downwardly by means of the pin 58 engaging the arm 60 and lowering the finger 64 as the rack rod 34 moves on its reverse stroke.

The arm 60 carries a pivoted dog 68 as shown in Figures 9 and 10. As the rack rod 34 is lowered, the dog 68 engages a ratchet 69, rigidly mounted on the shaft 62. The shaft 62 also carries a 10-toothed gear 70 (Figure 4) which meshes with a 10-toothed gear on the units printing wheel 71, which is provided with printing numbers showing the total number of passengers carried. The gear 70 is provided with an annular flange 72 which is provided with a single tooth 73, which tooth 73 engages with one of the ten notches 74 of the gear 75' carried by the tens printing wheel 75. It will therefore be obvious that the gear 70 is rotated one notch each time a fare is registered and the gear 70 will rotate the printing wheel 71 one notch, or from the printing number previously in position to the next succeeding number. When the gear 70 has made a complete revolution, the tooth 73 engages one of the notches 74 on the tens printing gear 75' and rotates the tens printing wheel one notch or one-tenth of a revolution, which likewise rotates the tens gear 76 one-tenth of a revolution. The hundredths printing wheel 77 is actuated in like manner. It will be understood that each of the printing wheels 71, 75, 77, and 79 are loosely mounted on the shaft 78 and that each of these wheels is provided with ten printing members from 0 to 9 inclusive. These printing wheels serve as a means, therefore, for counting the number of fares which have been collected, since the machine has been in operation. These wheels count up to 9,999, for the thousandths printing wheel is actuated by the hundredths gear 76 in like manner, as are the printing wheels 75 and 77. Obviously additional printing units could be provided if desired.

Means are provided whereby the tens counter 80 (Figures 2, 4 and 5) is actuated one notch or one-tenth of a revolution, when the units counter 66 has made a complete revolution and whereby the hundredths counter 81 is rotated for one-tenths of a revolution, when the tens counter 80 has completed a revolution. Referring to Figures 4, 9 and 13 it will be noted that a disk 82 is secured to the hand lever 83. This disk 82 is provided with a triangular-shaped cam 84 and as the hand lever 83 is rotated from a vertical position, as shown in Figure 13, in a clockwise direction, the cam 84 engages a lever 85, fulcrumed on a shaft 86. The lever 85 carries a yoke 87, which yoke is provided with two star wheels 88 and 89. As the units counter 66 makes a complete rotation, the star wheel in mesh with the gear 90' secured to the counter 80, rotates the counter 80 for one-tenth of a revolution as is fully described in the application of Wheelbarger 759,170.

When the end of the run is reached the conductor moves the hand lever 83 into its upper or lower position and in either case the cam 84 engages the lever 85 and raises the star wheels 88 and 89 out of mesh with the gears on the counters 66, 80 and 81. This movement rotates the lever 86ᵃ (Figure 12) secured to the shaft 86 away from the toothed wheel 91 so that the finger 92 of the lever 86ᵃ is withdrawn from the notch 93 of the toothed wheel 91 or in a clockwise direction. A lug 94 on the lever 86ᵃ engages a cam surface 95 of the lever 96 fulcrumed at 97 to the side frame 36 of the machine depressing the lever 96 against the tension of its spring 97′, secured to the lever and the side wall 36 and thereby actuating or lowering the lug 98 forming a part of the lever 96 below the lug 99 carried by the toothed wheel 91. As soon as the lug 94 passes beyond the cam surface 95, the lever 96 is raised by the spring 97′ so that the lug 94 drops into a notch 100 of the lever 96. This notch holds the finger 92 on the lever 86ᵃ out of the notch 93 of the toothed wheel 91. The toothed wheel 91 therefore may be now rotated in a clockwise direction. A dog 101 prevents anti-clockwise rotation, which dog is pivoted on a pin 102 on the side wall 36 of the machine and is pulled against the periphery of the toothed wheel by a spring 103. Just before the lever 90 completes its movement in a clockwise direction, its lower end 104 engages a pin 105 carried by a lever 106 pivoted on a pin 107. The lower end of the lever is thereby moved to the left as viewed in Figure 12 and to the right as viewed in Figure 7, so as to overlie the upper end of the rack rod 34. It is therefore apparent that when the end of the run is reached and the direction lever 83 has been actuated by raising or lowering the same, the lever 106 locks the machine against operation.

In order to remove the lever 106 out of the path of movement of the rack rod 34 it is necessary that the counters 66, 80 and 81 should be reset, which is accomplished by rotating the thumb wheel 114 on the shaft 115 in a clockwise direction. As the toothed wheel 91 is thus rotated, the counters 66, 80 and 81 are reset by any well-known mechanism such as that shown and described in the above mentioned application of Wheelbarger 759, 170, and the lug 99, just before completing its revolution engages the lug 98 depressing the lever 96 so as to disengage the lug 94 to permit the lever 90 to be pulled towards the toothed wheel 91 by means of the spring 107′ (Figure 13) secured to the lever 85 and to a sleeve 414 on the shaft 78. The lever 106 is now retracted from the path of movement of rack rod 34 by means of a spring 108 secured to said lever and to one of the side walls of the machine.

The disk 82 is pivoted on the shaft 109 and this disk is provided with teeth 110 which mesh with a pinion 111, which is fast on the shaft 78 (Figure 5). A direction printing wheel 113 is also secured to the shaft 78 and on this printing wheel is suitable indicia such as "N" for north, "S" for south or any other suitable indicia. The counters 66, 80 and 81 are loosely mounted on the shaft 115 but means are provided to hold these counters against rotation except when they are being reset by the thumb wheel 114 or while they are being actuated when a fare is being registered. This holding means consists of the star wheels 88 and 89, a dog 67 and three dogs 117 secured to the shaft 123. The dog 67 is in the form of a bell crank lever pivoted to a partition wall 118 and tensioned by means of a spring 119 secured to one end of the dog 67 and to the partition wall 118. This dog is clearly shown in Figure 9.

By referring to Figures 4 and 13, it is seen that the disk 82 is provided with an arcuate cam 120, which, when the disk 82 is being rotated to change the direction, engages a lever 121 fulcrumed on the shaft 62 and provided at its upper end with a projection 122 adapted to engage the teeth of the gear attached to the counter 81. It would be, therefore, impossible to turn the thumb wheel 114 unless the direction had been completely changed. As soon as the direction lever 83 has been moved its full distance the cam 120 passes beyond the lever 121 so that the conductor can rotate the counters 66, 80 and 81 back to zero. As the counters approach the zero point, the three dogs 117 secured to the shaft 123 rotatably mounted in the side wall 36 and the partition wall 118 move inwardly towards the counters 66, 80 and 81 engaging pins 124 carried by the said counters and stopping each of the counters at zero. As long as the dogs are in engagement with the pins 124 the counters are prevented from rotating further in one direction, while the dog 67 acting in conjunction with the star wheels prevents any rotation in the other direction. The dogs 117 are normally pulled away from the counters by means of a spring 125 (Fig. 9) secured to a pin 126 on the side wall 36 of the machine.

A cam 133 is secured to the shaft 115, which cam is provided with a cutaway portion ending in a shoulder 134. A dog 135 is rigidly secured to the shaft 123 so as to move with the dogs 117 which are also rigidly secured to the said shaft. As the shaft 115 is rotated clockwise as viewed in Figure 9 on the resetting operation the cam 133 moves the dog 135 to the left which is the means of overcoming the tension of the spring 125 and moves the dogs 117 so as to be in the path of movement of the pins 124. This movement however does not take place until after the pins 124 have passed beyond the ends of the dogs 117. The instant the counters are reset, the shoulder 134 passes beyond the dog 135 and the spring 125 pulls the dog into the cutaway portion of the cam. The dog 135 (finger 92 and pawl 67) now hold the shaft 115 against movement in any direction. The conductor, therefore, cannot reset the counters 60, 80 and 81 beyond the zero point nor can he reset the counters twice in succession and it is necessary for him to completely reset the counters before he can operate the machine, as heretofore described.

The lever 127 is rotatably mounted in the side frame 36 by means of a pin 128, which lever engages one of the dogs 117, as shown in Figures 4, 9 and 13. The spring 52 operatively connects the lever 44 and lever 127. The lower end of the lever 127 projects downwardly against the end of the full stroke mechanism 51 and the upper end of the lever 127 engages one of the dogs 117 rotating the shaft 123 and pushing the upper end of the dogs into the path of movement of the pins 124. However, when the counters 66, 80 and 81 have been reset and upon actuation of the rack rod 34, the full stroke mechanism 51 is raised, which raises the lower end of the lever 127 and removes the upper end thereof from engagement with the dog 117. The spring 125 now pulls the dogs out of the path of movement of the pins 124 so that the dogs thereafter present no interference to the proper actuation of the counters to count the number of passengers for that trip. The lever 127 also carries an arm 392 which engages the pinion 111, holding it against rotation as long as the lever 127 is holding the dog 117.

The disk 82 is also provided with a cam 129 (Figure 9) which engages a pin 130 on the lever 106 which pulls the lever 106 when the disk 82 is being rotated so that the lower end thereof will lie in the path of movement of the rack rod 34. The cam 129 (Fig. 9) serves as an effective means to move the lever 106 to a position such as to lock the rack rod 34 against movement, but it must be remembered that after the gear 82 completes its rotative movement the cam 129 is no longer in engagement with the pin 130. It is at this time that it is necessary for the lower end 104 of the lever 90 to engage the pin 105 so as to hold the lever 106 in locking engagement with the rack rod 34 when the cam 129 has moved beyond the pin 130. It is therefore, impossible to register passengers unless the direction indicating lever is completely up or completely down. The disk 82 is also provided with a cam 131 which engages a lever 132 tensioned by a spring 132ª. The object of the lever 132 is to provide holding means to hold the disk 82 in position so that the disk will not rotate unless sufficient force is put upon the lever 83 to overcome the tension of the spring 133.

The fare indicating drums 136, 137 and 138 indicate the cents, dimes, and dollars charged for the transportation of passengers and are loosely mounted on the shaft 115. Each of these drums is provided with numerals from zero to nine inclusive, to indicate the fare paid. The hand lever 139 which is the units lever is mounted on a sleeve 140 which sleeve is on the shaft 109, which sleeve carries a gear 141 which meshes with a pinion 142 loosely mounted on a shaft 143 supported by the side walls of the machine. The pinion 142 meshes with a pinion 144 loosely mounted on a shaft 145 supported by the side wall 146 of the machine and the partition wall 118. The pinion 144 meshes with a pinion 147 secured to the units fare indicator 136. The lever 139 extends through the slot 148 in the casing 5 and adjacent to this slot are numerals one to nine inclusive. The conductor moves the hand lever 139 to a position adjacent the proper cents numeral and this movement rotates the disk 136 so that the proper cents numeral will appear in the opening 149 in the front of the casing.

In like manner the tens lever 150 is secured to a sleeve 151 on the shaft 109 which sleeve carries a gear 152 which meshes with the pinion 153 loosely mounted on shaft 143, which pinion drives a gear 154 loosely mounted on the shaft 145, which gear drives a pinion 155 secured to the tens fare indicator drum 137.

In like manner the dollar lever 156 is carried by a sleeve 157 on the shaft 109 which sleeve has secured thereto a gear 158 meshing with a pinion 159 carried by a collar 160 loosely mounted on the shaft 143, which collar also carries a gear 161 which drives a gear 162 loosely mounted on the shaft 145, which gear drives a pinion 163 secured to the dollar drum 138. The sleeve 157 lies immediately adjacent the shaft 109 and surrounds the same while the sleeve 151 surrounds the sleeve 157 and the sleeve 140 is rotatably mounted on the sleeve 151 so that the sleeve 157 is an inner sleeve, the sleeve 151 is an intermediate sleeve and sleeve 140 is an outer sleeve as clearly shown in Figure 5. The dollars, dimes and cents levers are moved through slots in the casing 5 to indicate any fare from one cent to nine dollars ninety-nine cents and whatever fare is so indicated will appear behind the opening 149 in the casing so that it may be readily seen by the passengers.

Means are also provided to show the class of the fares as, for instance, a ticket, one-half fare, commutation, school, coupon, mileage, transfer, pass, round trip, clergyman or any other class of fare which might be in use on the transportation company. The class of fare is indicated behind the opening 149 by means of a drum 164, which drum is actuated by means of a lever 165 mounted on a sleeve 166 rotatably mounted on the sleeve 140, which sleeve 166 carries a gear 167 which drives a pinion 168 mounted on a sleeve 169 on the shaft 143, which sleeve carries a pinion 170 which drives a gear 171 which actuates a pinion 172 secured to the drum 164 which indicates the class of fares on the periphery thereof.

Each of the gears 167, 141, 152 and 158 meshes with the pinions 173, 174, 175 and 176 respectively, (see Fig. 5) each of which pinions are secured to printing wheels 177, 178, 179 and 180 respectively, rotatably mounted on shaft 78. These disks are provided with raised printing characters adapted to print the proper fare and classification thereof.

The date printing means is conventional and consists of thumb wheels 181, 182, and 183 secured to sleeves 184, 185 and 186 respectively which sleeves are rotatably mounted on the shaft 190, which sleeves are provided with gears 187, 188 and 189 respectively, which gears mesh with gears 191, 192 and 193 respectively, which latter gears are secured to the printing wheels 194, 195 and 196 respectively. These wheels carry printing type to show the month and date. The wheels 197 and 198 carry type indicating the year. No means is shown for adjusting the wheels carrying the year printing type for they are adjusted manually only once a year.

The indicia that appears in the openings 164 and 199 in the front of the register are apparent to the passengers, and relates only to the number of fares collected on that particular trip, the class of fares which the last passenger paid and the amount or value of the ticket or the cost of transportation to him.

As heretofore mentioned, however, it is necessary in order to accomplish the object of this invention to indicate on the ticket the number of the station, at which the passenger boarded the car, as well as the number of the station which is his destination. The levers 200, 201 and 202 slide through the openings or slots 203 in the back of the casing. Adjacent to these slots are numerals from zero to nine inclusive, which numerals indicate by number the station where the passenger boarded the train. The levers 200, 201 and 202 are secured to sleeves 204, 205 and 206 respectively, which sleeve 204 is rotatably mounted on the shaft 109, the sleeve 205 being rotatably mounted on the sleeve 204 and the sleeve 206 being rotatably mounted on the sleeve 205. The sleeves 204, 205 and 206 are provided with gears 207, 208 and 209 respectively, which gears mesh with pinions 210, 211 and 212 respectively, which pinions are rigidly secured to printing wheels 213, 214 and 215 respectively. The disks 213, 214 and 215 are provided with printing type consisting of numerals from zero to nine inclusive. The gears and pinions are, of course, provided with a suitable number of teeth so that the proper printing numerals will appear in place according to the postion of the levers.

The levers 216, 217 and 218 likewise slide in slots in the casing and adjacent to these slots are numerals from zero to nine inclusive, to indicate the number of the station which is the destination of the passenger. The levers 216, and 217 are secured to sleeves 219 and 220 respectively, which sleeves are rotatably mounted on the shaft 109. The sleeves 219 and 220 are provided with gears 221 and 222 respectively, while the lever 218 is directly secured to a gear 223. The gears 221, 222 and 223 are in mesh with and actuate pinions 224, 225 and 226 respectively, which pinions are secured to the printing wheels 227, 228 and 229 respectively, which wheels are provided with printing numerals from zero to nine inclusive. It will therefore appear that the shaft 78 carries printing type, which indicates the year, month and day, the station where the passenger boarded the car, the direction of travel, the destination, the amount he paid for the transportation, the class of transportation, the total number of passengers carried to date and all of these printing type are in alignment with the type carried by the conductor's key 477. The number of the machine will also be indicated by means of a printing plate 230 (Figure 4) secured to the partition wall 118. A depending yoke 112 is supported by the shaft 62 and 78, the lower end of which yoke is provided with a $ mark and a decimal mark on opposite sides of the dollar printing wheel 180.

Referring to Figure 11, it will be noted that the gear 167 meshes with and drives a pinion 231 on a shaft 232 which pinion 231 is secured to a gear 233 which drives a gear 234, which drives a total adding mechanism, designated generally by the reference character 235 (Figure 4) which to al adder mechanism is fully described in the application of Albert S. Wheelbarger 28,552, filed May 7, 1925, which mechanism is not described in this application. The total adder mechanism is a means for adding the number of fares registered to date and the total amount of money paid by the passengers for transportation. Impressions of these totals may be taken by means of a key 236 which by means of the mechanism shown in the application above mentioned prints a record, as is indicated on Figures 4 and 17 of the drawings by the reference character 237, which record from the totalizer also indicates the number of the machine. Such a total record strip is very valuable when the accounts are being audited as more fully described hereafter.

The printing unit consists of a left-hand side plate 240 and a right-hand side plate 241 which are connected by cross rods 242, 243 and 244. Studs 245 are provided extending outwardly from each side of the printer, which studs support rails 246 adapted to travel between rollers 247 rotatably mounted on the stud shafts 248 carried by the side walls of the machine. The entire printing unit may be inserted within the frame of the machine by sliding the rails 246 between the rollers 247 and may be locked in place by means of bell crank levers 249 and 250 each of which is rigidly mounted on a shaft 251 rotatably mounted in the side walls 240 and 241 of the printer. These levers are provided with hooked ends 252 and 253 respectively to engage pins 254 and 255 respectively carried by the side walls of the machine.

The left-hand side plate 240 of the printer is provided with a pin 393. As the printer is inserted within the machine, the pin 393 engages a stud 395 carried by the lower end of a bar 394 pivoted to the side wall 36 of the machine by means of a pin 396. The bar 394 is provided with a lug 397 adapted to engage a recess 398 in the rack bar 34. The bar 394 is provided with a spring 399 which spring tends to pull the lug 397 so that it will lie in the recess 398. When the printer is in position within the machine, the pin 393 holds the lug 397 out of the recess 398 but if the printer is removed, for any reason, the spring 399 actuates the bar 394 so that the lug 397 projects within the recess 398 and thereby locks the rack rod 34 so that it cannot be reciprocated. Since the rack rod 34 is the actuating means for the machine it would follow that the entire machine is locked against operation unless the printer is fully inserted within the machine.

Projecting from the left-hand side plate 240 are stud arms 256 carrying a plate 257 extending longitudinally of the printer. The right-hand side wall 241 supports a plurality of studs 258 which support a friction plate 259 spaced from the side wall 241 and normally pushed away from the side wall by means of springs 260. A removable rod 261 passes through the side walls 240 and 241, through the plate 257 and the friction plate 259 which rod supports a roll of paper 262 which roll of paper is frictionally held between the plates 257 and 259 by means of the springs 260 which press the plate 259 against the said roll. The roll 262 is the supply roll for the tickets which are to be printed.

Means are provided to print the rules of the company or any other printed matter, and another means is provided to print subsequently on the ticket the date, the direction of travel, the station where the passenger boarded the car, his destination, the amount which he paid for his transportation and the total number of passengers carried to date. The first mentioned printing means includes a roller 263 revolvably mounted on the shaft 251. The shaft 251 supports duplicate arms 264 which arms are in the shape of a bell crank lever and are tensioned by means of a spring 270 so as to be held against adjusting studs 266, which springs are attached to the arms 264 and secured to the cross bar 266' secured to the side walls of the printer. A shaft 267 is rotatably mounted in the arms 264 which shaft supports a platen 268. Bell crank levers 269 are pivoted on the shaft 267 and between the arms 264 lying immediately adjacent to said arms. The spring 265 is connected with the upper end of each of the bell crank levers 269 and to the cross bar 266'. The lower end of the bell crank lever supports a rotary ink pad 271. A roller 272 is mounted on a shaft 273 which may be slipped into slots 274 (Figure 6) of the printer. The side walls of the printer are provided with studs 275 which carry arms 276 which arms are provided with a shoulder 277 and the extreme upper ends of the arms carry a shaft 278 which shaft carries a guide roller 279 which also exerts tension on the paper. The arms are held under tension by means of springs 280 attached to the arms and the side walls of the printer. A shaft 281 is rotatably mounted in the side walls of the printer, which shaft is provided with a printing segment 282 such as an electrotype, containing the rules of the company or statement that the tickets are a receipt for the fares paid or any other descriptive matter desired. A cam 283 is also carried by the shaft 281 which shaft is rotated by means hereinafter to be described.

A gear 286 is rigidly secured to the collar 285 rotatably mounted on the stub shaft 284, and a chambered disk 287 is rigidly secured to the gear 286, which disk is provided with a circular orifice 288 and a slot 289 extending through the disk 287. One of the pins 290 supporting one of the rollers 35 is provided with an inwardly extended projection having its upper and lower surfaces parallel. This projection or lug passes through the slot 289 when the printing mechanism is being inserted into the frame of the machine and thereafter passes into the orifice 288. As the gear 286 rotates the disk 287 the inner periphery of the disk engages the lug 290 and holds the gear 286 in mesh with the gear 40 which is the driving gear for the gear 286. The disk 287 is provided with a notch 291 adapted to receive a lug 292 extending upwardly from a lever 293 pivoted on a pin 294 on the side wall 240 of the printer. This lever is normally pulled upwardly by means of a spring 295 attached to the lever and to the side wall 240 of the printer. The inner end of the lever is provided with a beveled surface 296. As the printer is inserted within the frame of the machine the beveled surface 296 engages a pin 297 (Figure 4) which pin depresses the lever and removes the lug 292 from the notch 291. The function of the lever 293 is to position the notch 289 relatively to the lug 290, for if the lug 290 were not in alignment with the notch 289 it would be impossible to insert fully the printer within the frame of the machine. Furthermore, the lever insures the parts being in the exact position in which they should be so that the second printing operation, hereinafter to be described, will be impressed on the ticket exactly where it should be relative to the printing which has been previously impressed thereon by the electrotype.

The collar 285 also carries a gear 298 (Fig. 14) rigidly secured thereto. The gear 298 meshes with and drives gears 299 and 300. The gear 300 is rigidly mounted on the shaft 281 and serves as a driving means for the electrotype 282. The shaft 281 also carries a segmental gear 301 which gear is provided with twelve teeth extending for approximately 120 degrees of its periphery and is provided with an arcuate flange 302. The side wall of the gear 301 is provided with a pin 303 for a purpose to be described.

The gear 299 is provided with crank arms 322 and 323 adapted to actuate an oscillating printing carrier 324 by means of pitmen 325 and 326 respectively, operatively connected with said crank arms and said oscillating printing carrier. The oscillating printing carrier is fulcrumed on a rod 326' rotatably mounted in removable bearings 327 extending through the side walls of the printer and secured thereto by means of screws 328.

The oscillating printing carrier 324 is provided with a shaft 329 rotatably mounted therein, which shaft is provided with a platen 330 and a gear 331 which gear is in mesh with an arcuate rack 332 secured to the side wall 240 of the printer, which gear 331 is also in mesh with a pinion 333 mounted on a stud shaft. An ink pad 335 is carried by a shaft 334 which shaft 334 is carried by arms 400 freely mounted on the shaft 329 and pressed upwardly by springs 401 but its upward movement is limited by a projection 402 underlying the shaft 337. The pinion 333 meshes with and drives a gear 336 mounted on a shaft 337 rotatably mounted in the oscillating printing carrier 324, on which shaft is secured a platen 338. The oscillating printing carrier 324 also carries a shaft 339 on which is mounted a segmental gear 340 which segmental gear meshes with the gear 331 and is driven thereby. A three-arm lever 341 is loosely fulcrumed on the shaft 339. The arm 342 of the lever 341 carries a link 343, which link carries a double-nosed pawl 344. The link 343 is connected to the arm 345 of the lever 341 by means of a spring 346 so that both noses of the pawl 344 are pressed against the teeth of a ratchet 347 secured to the shaft 339. The noses of the double pawl 344 are spaced apart by a distance of five and one-half teeth of the ratchet 347 which diminishes the number of teeth on the ratchet required for efficient and accurate operation. The arm 345 actuates a link 348 by means of a pin 349 operatively connecting the link and arm. The link 348 is provided with a slot 349' which slot receives a pin 350' carried by an arm 350 rigidly carried by a sleeve 351 on a shaft 352 carried by the oscillating printing carrier. The sleeve 351 is also provided with an arm 353 which carries a roller 354 which presses against the take-up roll 355 for the printed detailed record, as it has been unwound from the supply roll of paper 356 carried by the shaft 326 which is the bearing and support for the oscillating printing carrier.

A roller 357 (Fig. 7) is rotatably mounted on a shaft 358 carried in the side walls of the printing carrier. Arms 403 are fulcrumed on the shaft 358 which arms carry a rod 359. The rod 359 is normally urged toward the roll 356 by means of a spring 361' engaging a forwardly extending projection of the arms 403. The arm 345 of the three-armed lever 341 is provided with a pin 360 which is engaged by the sides of a notch 361 in the segmental gear 340. Two holding pawls 362 and 363 are mounted on the shaft 352 and are spring tensioned so as to hold the noses of the pawls against the ratchet 347 so as to prevent retrograde movement. The noses of these pawls are spaced apart a distance equal to one-half of the distance between two teeth of the ratchet, so that in no case can there be retrograde movement of the ratchet more than one-half the distance between two successive teeth, which insures an equal spacing between the successive impressions on the detailed printed record printed by the platen 330 engaging the type on the shaft 78 as will be hereinafter described.

Figure 14:
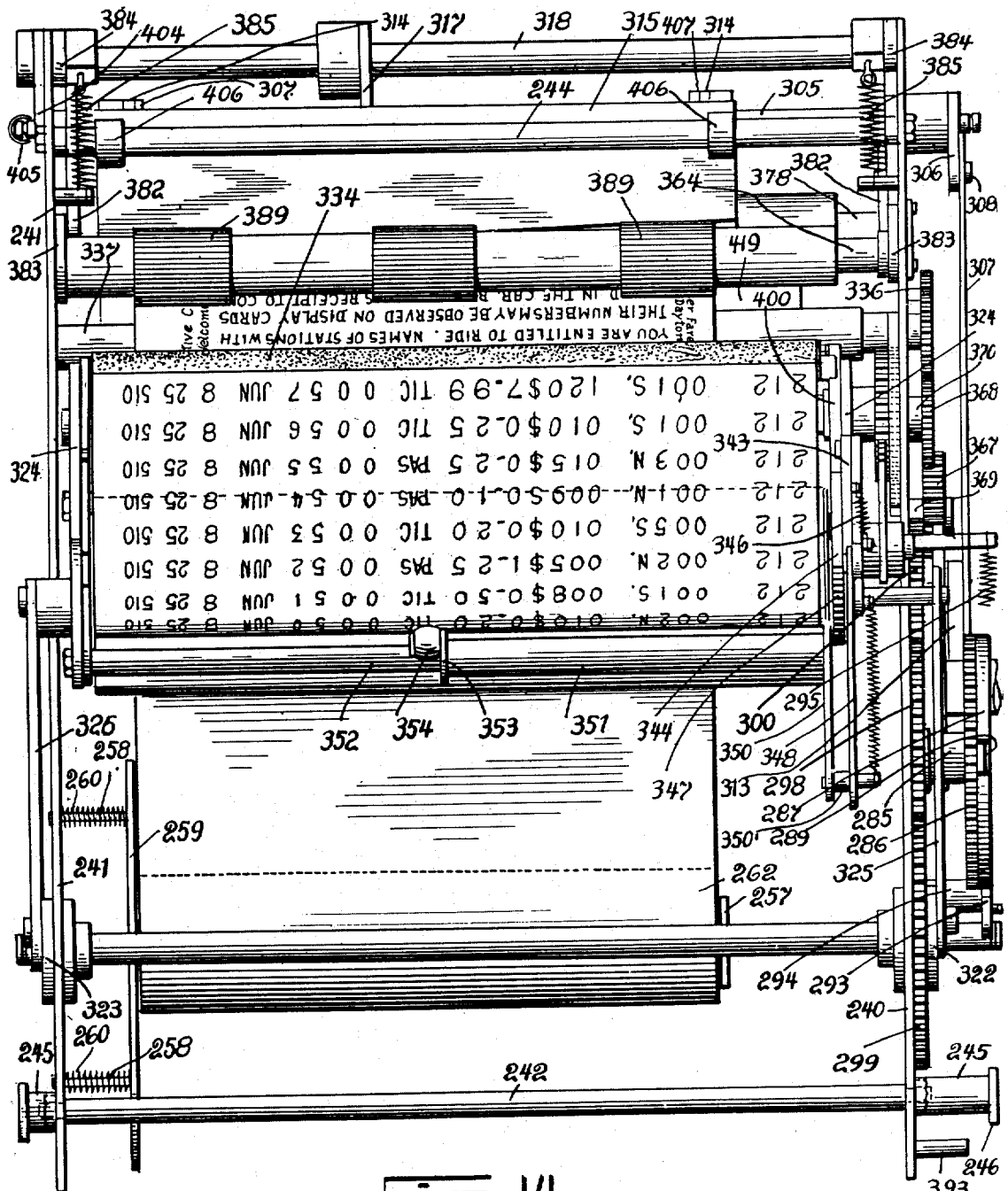
Figure 14 is a rear elevational view of the printing unit.

The cross rod 243 is provided with an angle plate 316 which carries a stationary shearing knife 304 provided with a shallow channel 419 near its edge. A shaft 305 is rotatably mounted in the side walls of the printer which shaft is provided with a crank arm 306 operatively connected with a rod 307 by means of a pin 308. The lower end of the rod 307 is connected by means of pin 309 to a lever 310 fulcrumed on a pin 311 carried by the side wall 240 of the printer, which lever 310 is provided with a cam lug 312. The rod 307 also carries a cam 313 which cam is in the form of a part of a ring having a greater radius than the radius of the segmental gear 301. The shaft 305 is provided with radially projecting arms 314, which arms extend through apertures in the reciprocating knife blade 315 which blade 315 is provided with a shallow channel 420, the channels 419 and 420 being on adjacent sides of the blades. A shaft 318 is rotatably mounted in the side walls of the printer, which shaft is provided with an arm 317 and arm 404 (Figure 14). A spring 405 is secured to the arm 404 and to the side wall 241 of the printer. The arm 317 carries a roller 319 which presses against the reciprocating knife blade 315, holding the knife blade 315 against the rollers 406 on the shaft 244 and against the outer edge of the stationary knife blade 304. The arms 314 which support and actuate the reciprocating knife blade, also carry stops 407 in the form of arms extending from the shaft 305 and terminating immediately in front of the reciprocating knife thereby holding the knife substantially against the rollers 406.

Shafts 366 and 375 are rotatably mounted in the side walls of the printer. The shaft 375 is provided with a finely corrugated feed roller 376, and the shaft 366 is provided with a smaller feed roller 365. The shaft 366 extends beyond the side wall 240 of the printer and on this extension is rigidly mounted a gear 373 and a gear 374 is similarly mounted on the shaft 375. These gears are driven through the instrumentality of the teeth on the segmental pinion 301 which teeth drive a gear 367 on the stud shaft 369, which gear 367 meshes with and drives a gear 368 on a stud shaft 370 carried by the side wall of the printer. The gear 367 has two half-width teeth 415 and 416 and the gear is so positioned relatively to the segmental gear 301 that the teeth 371 and 372, of the gear 367, abut against the periphery of the flange 302 of the segmental gear so that the gear 367 is locked against rotation until after the flange 302 has rotated so as to bring the double-width teeth 417 and 418 of the gear 301 into mesh with the half-width teeth 415 and 416.

Feed rollers 377 and 364 are positioned above and in contact with the rollers 376 and 365 respectively, and are secured to shafts 378 and 389 respectively. The shafts 378 and 389 are carried by levers 383 and the ends of the shafts project through slots as shown in Fig. 6 of the drawings which slots extend through the side walls of the printer. The lever 383 is carried by link 382 suspended from a lever 384 mounted on the shaft 318, which lever 384 is pulled downwardly by means of a spring 385 connected to one end of said lever and to the side walls of the printer. The rollers 364 and 377 may be raised so as to disengage the rollers 365 and 376 by means of a lever 387 mounted on a pin 387ª secured in the side walls of the printer, which lever is provided with a cam surface 390 adapted to engage a pin 388 carried by the link 382. When it is desired to disengage the upper feed rollers from the lower feed rollers, the operator raises the lever 387 so that the cam surface 390 raises the pin 388 raising the link 382 and the lever 383 thereby disengages the upper feed rollers from the lower feed rollers.

The operation of the printer is as follows: As the rack rod 34 moves upwardly by the conductor pressing the treadle 10 the gear 40 rotates in a clockwise direction, as viewed in Fig. 4 and makes a complete rotation and when the rack rod 34 descends the gear 40 remains stationary as heretofore described. The gear 286 is the same size as the gear 40 and it would follow that the gear 286 is given a complete rotation in a clockwise direction as viewed in Fig. 6, upon each upward actuation of the rack rod 34.

As soon as the gear 286 commences its rotation it drives the gear 298 which drives the gear 299 in an anti-clockwise direction as viewed in Fig. 6, and the gears 300 and 301 in an anti-clockwise direction. This motion continues as long as the gear 286 is rotated by the gear 40. The shaft 281 being thereby rotated, the electrotype 282 engages the ink pad 271 so that the electrotype is inked and the electrotpye is now brought into contact with the paper which has traveled from the roll 262, beneath the roller 263 over the roller 272 and beneath and partly around the platen 267, impressing on the paper all the printing matter shown in Fig. 16 except the first line thereon. The cam 283 now engages the shoulder 277 moving the roller 279 outwardly so as to advance the strip of paper, so as to leave a blank space between successive impressions made by the electrotype 282, the paper being held against retrograde movement by means of the feed rollers 364 and 365.

Figures 7, 8:
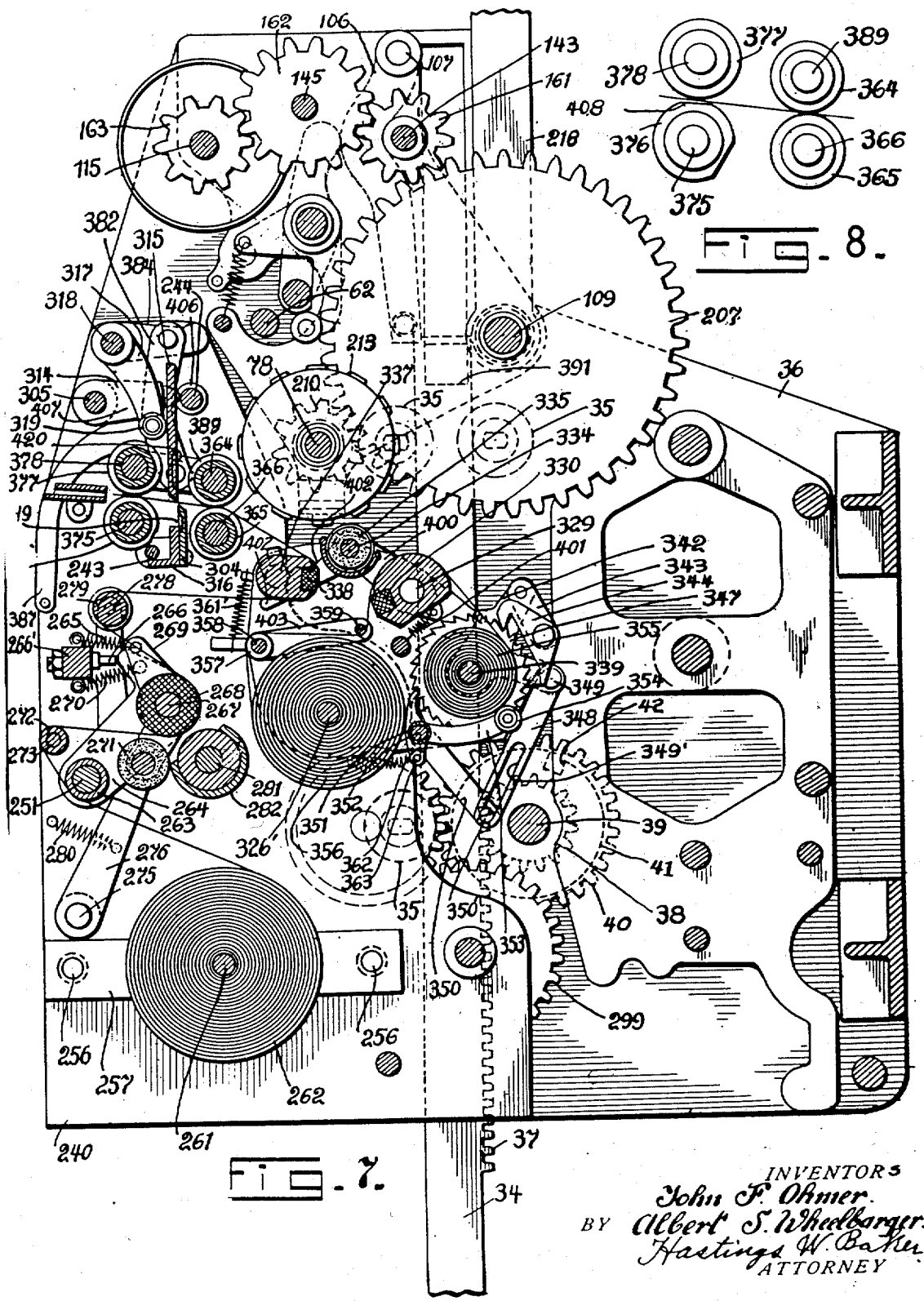
Figure 7 is a sectional view through the machine showing the printing mechanism in position within the machine.
Figure 8 is an enlarged view of the paper feed rollers for the tickets.

As soon as the gear 299 commenced to rotate the pitmen 325 and 326 were moved downwardly, rotating the gear 331 in a clockwise direction on a shaft 329, the gear 331 being so rotated by means of the entire carrier 324 moving on its axis 326 in an anti-clockwise direction as viewed in Fig. 6 while the rack 332 remains stationary, it being fixed on the frame. The movement of the carrier 324 wipes the ink roller 335 against the lowermost of the printing type mounted on the shaft 78. In Fig. 7 the parts are shown in that position in which the ink roller 335 has just passed from beneath these characters which are now ready to give an impression when the paper is brought into contact with the printing type just mentioned, which type will make the printed impression as shown on the first line of Fig 16, as well as the printed part of Fig. 15, except the two extreme end numerals, which end numerals are printed only on the detailed record which will be described. By the time the pitmen 325 and 326 have been lowered as much as possible, the carrier has been rotated as far as possible toward the right as viewed in Fig. 7, so that the platen 338 is now directly beneath the shaft 78. While the carrier has been moved as described the platen 338 has been rotated in an anti-clockwise direction as viewed in Fig. 7, so that it is now extending at right angles to the position shown in Fig. 7, and holds the paper which has previously received an impression from the electrotype 282 against the lowermost type on the shaft 78 thereby impressing the printed matter as shown on the first line of Fig. 16 upon the ticket. Attention is in particular called to the fact that the relative movement of the carrier and the platens, one moving clockwise and the other anti-clockwise, holds the paper against the type without any wiping action whatsoever, so that the printed impression is clear and distinct.

During this quarter rotation of the gear 286 the pin 303 has engaged the cam 313 completely raising the reciprocating knife, but the gear 367 has remained inoperative for the tooth 371 is still riding on the periphery of the disk 302 so that the feed rollers 365 and 376 are inactive.

As long as the gear 331 rolled on the rack 332 rotating on its axis in a clockwise direction as viewed in Fig. 6, it was rotating the segmental gear 340 in an anti-clockwise direction so that the recess 361 engages the pin 360 shortly after this operation commences actuating the arm 342 of the lever 341 in an anti-clockwise direction as viewed in Fig. 6 so that the paper from the previously printed detailed record is wound upon the shaft 339. The supply roller 356 provides the paper for the detailed printed record. The paper after leaving the roller 356 passes upwardly over a roller 357 on the shaft 358, and under the rod 359 carried by the arms 403 and thence passing over the platen 330 to the take-up roll 355. As the paper winds on the roll 355 the roller 354 is moved outwardly thereby moving the arm 353 in a clockwise direction as viewed in Fig. 7, and pulling the rod 348 downwardly. It is therefore apparent that as the take-up roll increases in diameter, the pin 360 will be moved further and further from the notch 361 in the segmental gear 340 so that the greater the diameter of the roll the further the segmental gear must be rotated before it engages the pin 360 to operate the arm 342 and ratchet 347. Unless such a means were provided the printed lines on the detailed record as shown on the Fig. 15, would not be equally spaced apart, and the spaces would increase as the diameter of the take-up roll increased.

After the crank arms 322 and 323 have left the lowermost position, the pitmen ascend and rotate the printing carrier 324 in an anticlockwise direction as viewed in Fig. 6, rotating all of the gears carried by the carrier in the reverse direction from that heretofore described. The pin 303 still maintains the knife in its raised position, the ink pad is again wiped across the lowermost printing characters carried by the shaft 78 and just before the gear 286 has completed its first one-half rotation, the tooth 371 of the gear 367 engages the teeth of the segmental gear 301 and the feed rollers 365 and 376 commence their rotation pulling the newly printed ticket between the rollers 364 and 365, under the knife and between the rollers 376 and 377 or into a position where it may be severed by the knife. The segmental gear 340 has been receding from the pin 360 but the spring 379 acting on the link 380 operatively connecting the spring and the lever 341 has maintained the pin 360 in the notch 361.

As the gear 286 continues its rotation for its third quarter revolution the feed rollers continue to pull the paper in position while the pin 303 passes beyond the cam 313 so that the knife can be actuated. The shaft 329 is being carried by the carrier 324 in an anti-clockwise direction as viewed in Fig. 7 and the platen 330 is being rotated in a clockwise direction as viewed in Fig. 7 on its shaft 329, bringing the platen directly beneath the lowermost printing characters carried by the shaft 78 and pressing the detailed record paper against these freshly inked type as well as against the characters 230 indicating the number of the machine and the type carried by the conductor's key 77.

During the last quarter revolution of the gear 286, the rollers 365 and 375 complete the feeding of the ticket into position to be severed by the knife and hold the ticket in a taut condition. The feed rollers cease rotating since the tooth 371 now engages the periphery of the disk 302 and no more of the teeth of the gear 367 are in mesh with the segmental gear 301, the half-teeth 415 and 416 lying adjacent and behind the disk 302. The pin 303 now engages the cam lug 312 depressing the knife blade 315 and shearing the ticket from the remainder of the ticket strip and the cam 283 engages the shoulder 277, rocking the lever 276 in an anticlockwise direction as viewed in Fig. 7. The ticket strip is held by means of the feed rollers 364 and 365 so that retrograde movement of the ticket strip is impossible which necessitates additional paper unrolling from the roller 262 which provides a suitable spacing between successive tickets so that there would be a suitable upper and lower margin. The gear 286 has now completed its rotation. It is to be noted that the feed roller 376 is provided with a cutaway portion 408 which cutaway portion is directly beneath the roller 377 when the gear 286 has completed its rotation so that while the ticket remains between the rollers 376 and 377 and projecting through the slot 381 as shown in the Fig. 2, it may be readily removed by the passenger and the ticket will be in the position for him to read the same and to instantly note if the conductor has made any error in regard to the number of the station where he boarded the car, the direction of travel, his destination, or the amount he paid for the ticket as well as the date and the classification of the ticket, which are the factors in which the passenger would be interested.

Attention is called to the fact that the edge of the reciprocating knife blade 315 is not parallel to the edge of the knife blade 304 but extends at an angle thereto, as shown in Fig. 14, so that the cutting operation is a shearing action. The reciprocating knife blade is in the form of a trapezium and a portion of its lower edge or blade is always in contact with a portion of the edge of the knife blade 304 but this contacting portion is to one side of the path of movement of the ticket so as to permit of the ready passage of the ticket between the knife blades when the blade 315 is in a raised position and also provides a self-sharpening feature for the blades. It is a well known fact that paper readily dulls a blade but by means of the above described structure and the fact that only the edges are in contact on account of the cutting away portions 419 and 420 the knife blades are at all times maintained in a sharp and efficient condition.

In case it is desired to omit the pedestal, the machine may be operated by means of a crank 410 (Fig. 12) provided with a crank handle operated by the hand of the conductor, which crank 410 is secured to a shaft 411, which shaft is provided with a gear 412 in mesh with a gear 413 on the shaft 39. This construction is recommended in a portable machine such as mentioned heretofore.

Means are also provided to give an audible signal each time the machine is operated. This is accomplished by means of a disk 421 secured to the shaft 39 which disk is provided with a V shaped cutaway portion 422 one edge of which engages a lever 423 fulcrumed at 424 to the side wall of the machine, which lever is provided with a pivoted clapper 425 to tap a bell 426 when the disk 421 completes its rotation and the spring 427 urges the end of the lever to drop into the said notch moving the lever swiftly against the stop pin 428 so that the clapper 425 strikes the bell and instantly drops away from it.

The detailed record strip is shown in Fig. 15 and it will be noted that this detailed record furnishes for the auditor a complete statement of every transaction made by the conductor and identifies the machine and the conductor by number, the numeral 10 being carried by the conductor's key and the number 101 being the number of the machine, printed by means of the type 230. Each conductor is, of course, furnished with a different key. This detailed record furnishes to the auditor a permanent record and the number of registrations may be readily computed by subtracting the first serial number from the last serial number plus one, or in the illustration shown by subtracting 7044 from 7060 plus one. In practice the conductor would issue the first ticket to himself so that in the illustration shown there would have been 16 passengers carried on August 5, 1925, by conductor No. 10, using machine No. 101. This detailed record further indicates where each of the passengers boarded the car, the direction of travel and the various destinations. If the transportation company desires to register the amount collected in cash and to assign no value to the tickets collected, such as indicated by the first nine registrations on Fig. 15, the sum of money which the conductor should turn over to the company at the end of the run would be the sum of the money registrations, which in the instance shown would be $44.43.

The record furnished by the total adder as shown in Fig. 17 on the drawings, furnishes a ready means of ascertaining the number of passengers carried and the total collections received from the passengers, for by subtracting the amount $4060.31 which amount had been registered prior to the time that conductor No. 10 started the run with the machine No. 101, from the amount $4104.74, the amount which the machine had registered when conductor No. 10 completed his day's work, gives a difference of $44.43, which is the sum of the cash collections received by him. In like manner, the number of passengers carried is readily determined by subtracting the serial number 7044 from the serial number 7060, or in the illustation shown 16 passesges having been carried by conductor 10 using machine No. 101, the first ticket having been retained by the conductor as above mentioned.

Obviously, a machine having the total adding mechanism would be more expensive than a machine without this feature. The total adder mechanism may be omitted and the detailed record as shown in Fig. 15 will furnish to the auditor of the transportation company a complete record of every transaction. The detailed record may be omitted provided the total adder is included for the record from the total adder would indicate that tickets had been issued by conductor No. 10, which tickets had serial numbers 7044 to 7060 inclusive and the conductor would have these tickets in his possession when his run was completed, which tickets he would turn in with his daily report. The information on these tickets would be identical with the information on the detail record. It is therefore obvious that either the total adder or the detailed record mechanism may be omitted without in any wise impairing the usefulness of the machine. However, it would be more convenient to have both the total adder and the detailed record mechanism for it is much easier to get the information from the detailed record than is possible when the tickets are used for that purpose. Other units may be omitted without destroying the utility of the machine and as a matter of fact as heretofore mentioned, a highly efficient portable machine has been constructed weighing less than 5 pounds.

While this application discloses the preferred embodiment of this invention, we do not wish to be limited to the specific details shown and described herein, as it will be readily understood that these may be changed or varied within the scope of the claims.

Having described our invention, we claim:

1. In a ticket printing and issuing machine, a casing, a printing mechanism adapted to be inserted within or removed from the casing, and means to prevent the insertion of the printing mechanism unless it is in a predetermined position.

2. In a ticket printing and issuing machine, a casing, printing mechanism adapted to be inserted within or removed from the casing means to lock the printing mechanism within the casing and means to prevent the insertion of the printing mechanism within the casing unless one of the parts of the printing mechanism is in a certain position.

3. In a ticket printing and issuing machine, a casing, printing mechanism adapted to be inserted within or removed from the casing and means carried by the casing and the printing mechanism to prevent the insertion of the printing mechanism when the same has been partially operated.

4. In a ticket printing and issuing machine, a casing, printing mechanism adapted to be removably inserted within said casing, a gear to actuate said printing mechanism, driving means for said gear, a lug carried by said casing and means carried by said gear coacting with said lug to hold said gear in contact with its driving means.

5. In a ticket printing and issuing machine, a casing, a rack rod driving means, a removable printing unit actuated thereby and means whereby said driving means is locked against operation when said printing unit is removed from the casing.

6. In a ticket printing and issuing machine, a casing, a driving means, a removable printing unit actuated thereby, and means whereby said driving means is locked or unlocked according to the position of the printing unit.

7. In a ticket printing and issuing machine, a casing, a removable printing unit, a driving gear therefor and means to prevent the printing unit from being fully inserted within the casing unless the said gear is in the correct position.

8. In a ticket printing and issuing machine, a casing, a removable printing unit, a driving gear therefor, means to prevent the printing unit from being fully inserted within the casing unless the said gear is in the correct position and means to hold the gear in its correct position while the printing unit is being inserted.

9. In a ticket printing and issuing machine, a casing, a removable printing unit, a driving gear therefor, a chambered disk having a slot therein attached to said gear and a lug carried by said casing adapted to pass through said slot when the printing unit is being inserted within the casing and the gear is in correct position, said lug subsequently serving as a means to hold said gear against lateral movement while permitting it to rotate.

10. In a ticket printing and issuing machine, a casing, a removable printing unit, a driving gear therefor, a chambered disk attached to said gear and having a slot therein, a lug carried by said casing adapted to pass through said slot and means to hold the disk in such a position so that the slot will be in alignment with said lug when the printing unit is being inserted within the casing.

11. In a ticket printing and issuing machine, a casing, a removable printing unit, a guide means for said printing unit while it is being inserted within or removed from said casing, a driving gear to actuate said printing unit and means to prevent the printing unit from being fully inserted within the casing unless the said gear is in correct position.

12. In a ticket printing and issuing machine, a casing, a removable printing unit, a driving gear therefor, a chambered disk attached to said gear and having a slot and notch therein, a lug carried by said casing adapted to pass through said slot when the printing unit is being inserted within the casing and the gear is in correct position and means coacting with said notch to hold the said disk in such a position so that the slot will be in alignment with the said lug when the printing unit is being inserted within the casing.

13. In a ticket printing and issuing machine, an operating means, a removable printing unit, a gear driven by the operating means and serving as an actuating means for the printing unit, a disk carried by said gear having a notch in its periphery, a lever and a lug carried thereby coacting with the said notch to hold the gear in proper rotational position when it is removed from said operating means.

14. In a ticket printing and issuing machine, an operating means, a removable printing unit, a gear driven by the operating means and serving as an actuating means for the printing unit, a disk carried by the said gear having a notch in its periphery, a lever and a lug carried thereby coacting with the said notch to hold the gear in proper rotational position and means to lock the operating means so that it cannot be actuated when the printing unit is removed.

15. In a ticket printing and issuing machine, an operating means, a removable printing unit, a gear driven by the operating means and serving as an actuating means for the printing unit, a disk carried by said gear having a notch in its periphery, a lever, a lug carried thereby coacting with the said notch to hold the gear in proper rotational position, means to lock the operating means so that it cannot be actuated when the printing unit is removed from the casing and a lug carried by the said lever adapted to unlock said locking means when the printing unit is in position within the casing.

16. In a ticket printing and issuing machine, a casing, a removable printing unit, a driving gear therefor, a chambered disk secured to said gear and having a groove and a notch therein, a lug carried by said casing adapted to pass through said groove when the printing unit is being inserted and thereafter serving as a means to hold the gear against lateral movement, a lever, a lug carried thereon adapted to extend within the notch and hold the disk so that the groove will be in alignment with the lug when the printing movement is being inserted.

17. In a ticket printing and issuing machine, a casing, a removable printing unit, a driving gear therefor, a chambered disk secured to said gear and having a groove and notch therein, a lug carried by said casing adapted to pass through said groove when the printing unit is being inserted and thereafter serving as a means to hold the gear against lateral movement, a lever, a lug carried thereon adapted to extend within the notch and hold the disk so that the groove will be in alignment with the lug when the printing unit is being inserted and means to remove the lug carried by the lever from the notch so as to permit of the rotation of the gear as soon as the printing unit has been fully inserted within the casing.

18. In a ticket printing and issuing machine, a casing, a removable printing unit, a driving gear therefor, means whereby the driving gear is actuated, a chambered disk secured to said gear and having a groove and a notch therein, locking means for the means to actuate the driving gear, a lug carried by said casing adapted to pass through said groove when the printing unit is being inserted, a lever, a lug carried thereon adapted to extend within the notch to hold the disk so that the groove will be in alignment with the lug when the printing unit is being inserted and means carried by the lever to unlock the locking means as soon as the printing unit has been fully inserted within the machine.

19. In a machine of the class described, a stationary rack, a printing frame, means whereby said frame is oscillated, a take-up roll, a shaft carried by said frame on which said roll is mounted, a sleeve on said shaft, an arm and a lever on said sleeve, the position of said arm being governed by the thickness of said roll, means carried by the said frame coacting with the said rack to actuate said lever and means whereby said lever actuates said take-up roll.

20. In a machine of the class described, a stationary rack, a printing frame, means whereby said frame is oscillated, a take-up roll, a shaft carried by said frame on which said roll is mounted, a sleeve on said shaft, an arm and a lever on said sleeve, the position of said arm and lever being governed by the thickness of said roll and means carried by the said frame, coacting with the said rack to actuate said lever and means whereby said lever actuates said take-up roll, the position of said lever governing the amount of actuation imparted to said take-up roll.

21. In a machine of the class described, a stationary rack, a printing frame, means whereby said frame is oscillated, a take-up roll, a shaft carried by said frame on which said roll is mounted, a sleeve on said shaft, an arm and a lever on said sleeve, the position of said arm and lever being governed by the thickness of said roll and means carried by the said frame, coacting with the said rack to actuate said lever and means whereby said lever actuates said take-up roll, the position of said arm governing the amount of actuation imparted to said take-up roll.

22. In a machine of the class described, a stationary rack, a printing frame, means whereby said frame is oscillated, a take-up roll, a shaft carried by said frame on which said roll is mounted, a sleeve on the said shaft, an arm, a lever on said sleeve, the position of said arm and lever being governed by the thickness of said roll, means carried by the said frame coacting with the said rack to actuate said lever and a pawl operatively connected to said lever whereby said lever actuates said take-up roll.

23. In a machine of the class described, a stationary rack, a printing frame, means whereby said frame is oscillated, a take-up roll, a shaft carried by said frame on which said roll is mounted, a sleeve on said shaft, an arm and a lever on said sleeve, a ratchet secured to said shaft, a double-nosed pawl to actuate said ratchet, a link operatively connecting said lever and pawl whereby the amount of rotation imparted to said roll is dependent upon the amplitude of the movement of said lever and means carried by the said frame coacting with the said rack to actuate said lever.

24. In a machine of the class described a stationary rack, a printing frame, means whereby said frame is oscillated, a take-up roll, a shaft carried by said frame on which said roll is mounted, a sleeve on said shaft, an arm and a lever on said sleeve, a ratchet secured to said shaft, a double-nosed pawl to actuate said ratchet, a link operatively connecting said lever and pawl whereby the amount of rotation imparted to said roll is dependent upon the amplitude of the movement of said lever, means carried by the said frame coacting with the said rack to actuate said lever and a holding pawl supported by said shaft and in engagement with the said ratchet to hold the said ratchet against reverse rotation.

25. In a machine of the class described, a stationary rack, a printing frame, means whereby said frame is oscillated, a take-up roll, a shaft carried by said frame on which said roll is mounted, a sleeve on said shaft, an arm and a lever on said sleeve, a ratchet secured to said shaft, a double-nosed pawl to actuate said ratchet, a link operatively connecting said lever and pawl whereby the amount of rotation imparted to said roll is dependent upon the amplitude of the movement of said lever and means carried by the said frame coacting with the said rack to actuate said lever and means whereby said pawl is held in contact with said ratchet.

26. In a machine of the class described, a stationary rack, a printing frame, means whereby said frame is oscillated, a take-up roll, a shaft carried by said frame on which said roll is mounted, a sleeve on said shaft, an arm and a lever on said sleeve, means whereby one end of said arm is held against said roll to vary the position of said lever according to the thickness of said roll, means carried by the said frame coacting with the said rack to actuate said lever and means whereby said lever actuates said take-up roll.

27. In a machine of the class described, a stationary rack, a printing frame means whereby said frame is oscillated, said means including a lever and a segmental gear, means whereby said lever is positioned according to the thickness of the said roll so as to increase the distance between the lever and segmental gear as the thickness of the roll increases, means whereby the segmental gear is moved into contact with the said lever to rotate the same and means carried by the said lever whereby the roll is actuated.

28. In a machine of the class described, a bank of printing characters, a carrier, an ink roller and a plurality of platens mounted on said carrier, and means, including a rack, whereby said carrier is moved so as to bring successively said ink roller, one of said platens, said ink roller and the other of said platens into contact with the printing characters.

29. In a machine of the class described, a bank of printing characters, a carrier, an ink roller and a plurality of platens a gear operatively connected with one of said platens, a rack in mesh with said gear, means whereby said carrier is oscillated, and means including said rack and gear whereby said ink roller, one of said platens, said ink roller and the other of said platens is successively brought into printing contact with said characters.

30. In a ticket printing and recording machine, a bank of printing characters, a pivoted carrier, means whereby said carrier is oscillated, a stationary rack, a shaft carried by said carrier, a gear and a platen on said shaft, said gear being in mesh with said rack so as to roll on said rack and rotate its shaft, an ink roller carried by said carrier, said ink roller being wiped across said printing characters by the movement of said carrier and thereafter said platen being laterally moved and rotated so as to bring a strip of paper into contact with said characters to print a record.

31. In a ticket printing and recording machine, a bank of printing characters, a carrier, means whereby said carrier is oscillated, a stationary rack, a shaft carried by said carrier, a gear and a platen on said shaft, said gear being in mesh with said rack so as to roll on said rack and rotate its shaft in the opposite direction from the direction of oscillation of the carrier, an ink roller, said ink roller being wiped across said printing characters by the movement of said carrier, and the combined movements of said carrier and platen serving as a means to move a strip of paper into contact with said printing characters to print a record.

32. In a ticket printing and recording machine, a bank of printing characters, a carrier, means whereby said carrier is oscillated, a stationary rack, a shaft carried by said carrier, a gear and a platen on said shaft, said gear being in mesh with said rack so as to roll on said rack and rotate its shaft in the opposite direction from the direction of oscillation of the carrier, an ink roller, said ink roller being wiped across said printing characters by the movement of said carrier, and the combined movements of said carrier and platen serving as a means to raise and press a strip of paper into contact with said printing characters.

33. In a ticket printing and recording machine, a bank of printing characters, a carrier, means whereby said carrier is oscillated, a stationary rack, a shaft carried by said carrier, a gear and a platen on said shaft, said gear being in mesh with said rack so as to roll on said rack and rotate its shaft in the opposite direction from the direction of oscillation of the carrier, an ink roller, said ink roller being wiped across said printing characters by the movement of said carrier, the combined movement of said carrier and platen being such that the rotational movement of the carrier is neutralized by the reverse rotation of the platen so that a strip of paper is simply pressed against the printing characters so as to make a clear impression thereon.

34. In a printing machine, a supply roll of paper, an ink roller, a type carrier and a platen, means whereby the pressure between the type carrier and platen may be adjusted, means whereby said paper is fed from said supply roll between said platen and type carrier, and means whereby an additional length of paper is pulled from said roll to provide an upper and lower margin for the printing.

35. In a printing machine, a supply roll of paper, means whereby said roll is frictionally held against rotation, an ink roller, a type carrier and a platen, means whereby said paper is fed from said supply roll between said platen and type carrier, and means whereby an additional length of paper is pulled from said roll to provide an upper and lower margin for the printing.

36. In a printing machine, side walls therefor, a plate carried by one of said side walls, a friction means carried by the other of said side walls, a roll of paper carried by the said plate and friction means, an ink roller, a type carrier and a platen, means whereby said paper is fed from said supply roll by the said platen and type carrier, and means whereby an additional length of paper is pulled from said roll to provide an upper and lower margin for the printing.

37. In a printing machine, a shaft, a type segment on said shaft, means whereby said shaft is rotated, levers, a shaft carried thereby, a platen mounted thereon, a pair of levers mounted on said platen shaft, an ink roller carried by said pair of levers and means whereby said ink roller is urged toward said platen.

38. In a printing machine, a shaft, a type segment on said shaft, means whereby said shaft is rotated, levers, a shaft carried thereby, a platen mounted thereon, means whereby the distance between said shafts may be adjusted, a pair of levers mounted on said platen shaft, an ink pad carried by said pair of levers, and means whereby said ink pad is urged toward said platen.

39. In a printing machine, an oscillating carrier, a pivot therefor, a platen carried by said carrier, a pivot therefor, and means whereby said carrier and platen are oscillated on their pivots in opposite directions.

40. In a printing machine, a bank of printing characters, an oscillating carrier, a pivot therefor, a platen carried by said carrier and pivotally mounted thereon, and means whereby said carrier and platen are oscillated on their pivots in opposite directions so that all wiping action between said platen and printing characters is avoided.

41. In a printing machine, a bank of printing characters, a pivoted oscillating carrier, a pivoted platen carried by said carrier, and means whereby said carrier and platen are oscillated on their pivots in opposite directions so that a strip of paper will be pressed against said characters.

42. In a printing machine, a bank of printing characters, an oscillating carrier, a pivoted platen mounted thereon, means whereby said printing characters are inked and means whereby said carrier and platen are oscillated on their pivots in opposite directions.

43. In a printing machine, a bank of printing characters, an oscillating carrier, a pivoted platen mounted thereon, means whereby said printing characters are inked, and means whereby said carrier and platen are oscillated on their pivots in opposite directions, said inking means being carried by said carrier.

44. In a printing machine, a bank of printing characters, an oscillating carrier, a pivoted platen mounted thereon, means whereby said printing characters are inked, means whereby said carrier and platen are oscillated on their pivots in opposite directions, and a resilient mounting on said carrier for said inking means.

45. In a ticket printing machine, a bank of printing characters, a pivoted carrier, means whereby the carrier is oscillated, a platen and a take-up roll carried by said carrier, a gear operatively connected with said platen, and means whereby said gear rotates said platen in the opposite direction from the rotation of said carrier and operates said take-up roll.

46. In a machine of the class described, a disk, actuating means for said disk, a direction printer, means operated by said disk whereby said direction printer is adjusted, a passenger counter resetting mechanism therefor, and means whereby said resetting mechanism is locked until after said disk has been fully actuated.

47. In a machine of the class described, a disk, actuating means for said disk, a direction printer, means operated by said disk, whereby said direction printer is adjusted, a passenger counter, resetting mechanism therefor and lever means whereby said resetting mechanism is locked until after said disk has been fully actuated.

48. In a machine of the class described, a disk, actuating means for said disk, a direction printer, means operated by said disk whereby said direction printer is adjusted, a passenger counter resetting mechanism and lever and cam means whereby said resetting mechanism is locked until after said disk has been fully actuated.

49. In a machine of the class described, a disk, actuating means for said disk, a direction printer, means operated by said disk whereby said direction printer is adjusted, a passenger counter resetting mechanism, a lever and a means carried by the disk whereby said lever is actuated to lock said resetting mechansim until after the disk has been fully actuated.

50. In a machine of the class described, a disk, actuating means for said disk, a direction printer, means operated by said disk whereby said direction printer is adjusted, a passenger counter resetting mechanism, a gear carried by said resetting mechanism, and means acting on said gear to lock said resetting mechanism until after said disk has been fully actuated.

51. In a machine of the class described, a disk, actuating means for said disk, a direction printer, means operated by said disk whereby said direction printer is adjusted, a passenger counter, resetting mechanism, a cam carried by the disk, a gear carried by the resetting mechanism, and a lever actuated by said cam to lock said gear against operation while the disk is being rotated.

52. In a machine of the class described, a disk, actuating means for said disk, a direction printer, means operated by said disk whereby said direction printer is adjusted, a passenger counter resetting mechanism, means whereby said resetting mechanism is locked until after said disk has been fully actuated, and means tending to hold said actuating means against operation.

53. In a machine of the class described, a disk, actuating means for said disk, a direction printer, means operated by said disk whereby said direction printer is adjusted, a passenger counter resetting mechanism, means whereby said resetting mechanism is locked until after said disk has been fully actuated, and means tending to hold said actuating means against operation, said last mentioned means consisting of a cam carried by said disk, a lever in contact with said cam and a spring connected to said lever and tending to resist any movement of the lever by the cam.

54. In a machine of the class described, type wheels, printing mechanism adapted to be brought into or out of printing relation with said type wheels, and means to prevent said printing mechanism from being brought into operative position relative to said type wheels unless one of the parts of said printing mechanism is in normal position.

55. In a machine of the class described, type wheels, means whereby said type wheels are set, a printing mechanism, and means to prevent said printing mechanism from being brought into operative position relative to said type wheels when said printing mechanism has been partially operated.

56. In a machine of the class described, type wheels, manual means whereby said type wheels may be set, a removable printing unit, and means to prevent said printing unit from being brought into operative contact with said type wheels unless all of the parts of the said printing unit are in normal position.

57. In a machine of the type described, the combination of printing wheels, a unit consisting of a printing mechanism and a cutting mechanism, and means to prevent said printing mechanism and cutting mechanism from being brought into operative relation relative to said printing wheels unless said printing and cutting mechanisms are in normal position.

58. In a machine of the class described, the combination of type wheels, a unit consisting of printing, cutting and feeding mechanisms, and means whereby said printing, cutting and feeding mechanisms will be prevented from being brought into operative relation with said type wheels unless said printing, cutting and feeding mechanisms are in normal position.

59. In a machine of the class described, printing wheels, printing mechanism adapted to be brought into or out of printing relation with said printing wheels, means to prevent said printing mechanism from being brought into operative position relative to said printing wheels unless one of the parts of said printing mechanism is in normal position, and means to lock said printing mechanism in position relative to said printing wheels after the printing mechanism has been brought into operative relation therewith and partially operated.

60. In a machine of the class described, printing wheels, means whereby said printing wheels are set, a printing mechanism, means to prevent said printing mechanism from being brought into operative position relative to said printing wheels when said printing mechanism has been partially operated, and means to lock said printing mechanism in position relative to said printing wheels after the printing mechanism has been brought into operative relation therewith and partially operated.

61. In a machine of the class described, type wheels, manual means whereby said type wheels may be set, a removable printing unit, means to prevent said printing unit from being brought into operative contact with said type wheels unless all of the parts of the said printing unit are in normal position, and means to lock said printing unit in position relative to said type wheels after the printing unit has been brought into operative relation therewith and partially operated.

62. In a machine of the type described, the combination of printing wheels, a unit consisting of a printing mechanism and a cutting mechanism, means to prevent said printing mechanism and cutting mechanism from being brought into operative relation relative to said printing wheels unless said printing and cutting mechanisms are in normal position, and means to lock said printing and cutting mechanisms in position relative to said printing wheels after the printing and cutting mechanisms have been brought into operative relation therewith and partially operated.

63. In a machine of the class described, the combination of type wheels, a unit consisting of printing, cutting and feeding mechanisms, means whereby said printing, cutting and feeding mechanisms will be prevented from being brought into operative relation with said type wheels unless said printing, cutting and feeding mechanisms are in normal position, and means to lock said printing, cutting and feeding mechanisms in position relative to said type wheels after the printing, cutting and feeding mechanisms have been brought into operative relation therewith and partially operated.

In testimony whereof we affix our signatures.

JOHN F. OHMER.
ALBERT S. WHEELBARGER.